(12) United States Patent
Gandhi et al.

(10) Patent No.: US 10,162,622 B2
(45) Date of Patent: Dec. 25, 2018

(54) LOCAL OVER THE AIR UPDATE OF AN EMBEDDED SYSTEM

(71) Applicant: Ayla Networks, Inc., Sunnyvale, CA (US)

(72) Inventors: Pritish Gandhi, San Jose, CA (US); Peter F. Hunt, Sunnyvale, CA (US); Daniel J. Myers, Fremont, CA (US); Joseph R. Eykholt, Los Altos, CA (US); Adrian Caceres, Los Gatos, CA (US); Sudha Sundaresan, San Jose, CA (US)

(73) Assignee: Ayla Networks, Inc., Sunnyvale, CA (US)

( * ) Notice: Subject to any disclaimer, the term of this patent is extended or adjusted under 35 U.S.C. 154(b) by 126 days.

(21) Appl. No.: 15/055,409

(22) Filed: Feb. 26, 2016

(65) Prior Publication Data

US 2017/0249135 A1    Aug. 31, 2017

(51) Int. Cl.
| | |
|---|---|
| G06F 8/65 | (2018.01) |
| H04L 29/06 | (2006.01) |
| H04L 29/08 | (2006.01) |
| H04W 12/02 | (2009.01) |
| H04W 88/08 | (2009.01) |

(Continued)

(52) U.S. Cl.
CPC ............... *G06F 8/65* (2013.01); *G06F 8/654* (2018.02); *H04L 63/0492* (2013.01); *H04L 63/0853* (2013.01); *H04L 67/025* (2013.01); *H04L 67/04* (2013.01); *H04L 67/10* (2013.01); *H04L 67/125* (2013.01); *H04L 67/14* (2013.01); *H04L 67/34* (2013.01); *H04W 12/02* (2013.01); *H04W 88/08* (2013.01); *H04L 63/0272* (2013.01); *H04L 63/045* (2013.01); *H04L 63/123* (2013.01);

(Continued)

(58) Field of Classification Search
CPC .......... G06F 8/65; H04L 67/34; H04W 12/04
See application file for complete search history.

(56) References Cited

U.S. PATENT DOCUMENTS

| | | | | |
|---|---|---|---|---|
| 2003/0023962 | A1* | 1/2003 | Erickson | ........... G06F 8/63 717/171 |
| 2007/0169093 | A1* | 7/2007 | Logan | ............... G06F 8/60 717/168 |

(Continued)

FOREIGN PATENT DOCUMENTS

WO    WO2016007563    1/2016

OTHER PUBLICATIONS

International Search Report and Written Opinion of the International Searching Authority for International Application No. PCT/US2017/018351 dated May 5, 2017.

*Primary Examiner* — Joseph P Hirl
*Assistant Examiner* — Sayed Aresh Beheshti Shirazi
(74) *Attorney, Agent, or Firm* — Lowenstein Sandler LLP

(57) ABSTRACT

A computing device determines a unique identifier associated with a device comprising an embedded system. The computing device sends the unique identifier to a wide area network (WAN) accessible service and receives an encrypted digital image comprising a firmware update for the device comprising the embedded system from the WAN accessible service. The computing device stores the encrypted digital image in a storage area of the computing device and initiates an over the air update of firmware of the device comprising the embedded system using the encrypted digital image.

14 Claims, 14 Drawing Sheets

(51) Int. Cl.
*G06F 8/654* (2018.01)
*H04W 12/04* (2009.01)
*H04W 12/10* (2009.01)
*H04W 84/12* (2009.01)

(52) U.S. Cl.
CPC ............ *H04L 63/166* (2013.01); *H04W 12/04* (2013.01); *H04W 12/10* (2013.01); *H04W 84/12* (2013.01)

(56) References Cited

U.S. PATENT DOCUMENTS

| | | | | |
|---|---|---|---|---|
| 2008/0065816 | A1* | 3/2008 | Seo | G06F 8/65 711/103 |
| 2010/0208723 | A1* | 8/2010 | Olafsson | H04L 12/66 370/352 |
| 2010/0303438 | A1* | 12/2010 | Binder | H04L 12/66 386/230 |
| 2010/0315197 | A1* | 12/2010 | Solomon | G06F 21/31 340/5.2 |
| 2011/0173457 | A1* | 7/2011 | Reh | G06F 21/572 713/191 |
| 2013/0185548 | A1 | 7/2013 | Djabarov et al. | |
| 2013/0217332 | A1 | 8/2013 | Altman et al. | |
| 2014/0122674 | A1 | 5/2014 | Gray et al. | |
| 2014/0259147 | A1* | 9/2014 | L'Heureux | H04L 63/02 726/14 |
| 2014/0282482 | A1* | 9/2014 | Enns | H04L 29/08729 717/172 |
| 2015/0382339 | A1* | 12/2015 | Andreoli-Fang | H04L 51/38 370/329 |
| 2016/0036956 | A1* | 2/2016 | Debates | H04M 1/72525 455/419 |
| 2016/0248744 | A1* | 8/2016 | Adderly | H04L 63/08 |
| 2016/0335465 | A1* | 11/2016 | LeBlanc | H04L 12/2854 |
| 2017/0134995 | A1* | 5/2017 | L'Heureux | H04W 12/06 |

* cited by examiner

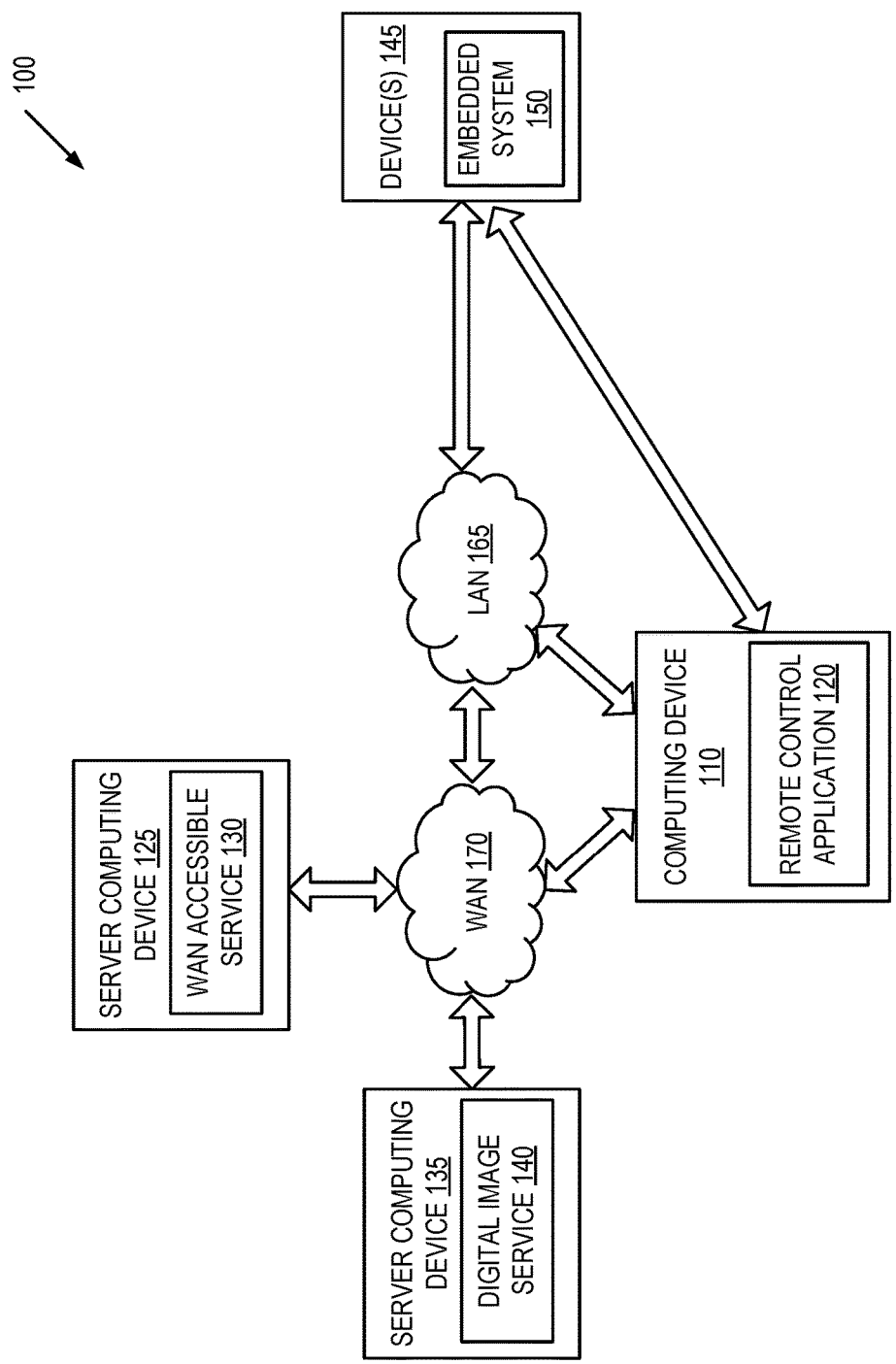

LOCAL OVER THE AIR UPDATE OF AN EMBEDDED SYSTEM

BACKGROUND

Many modern appliances, consumer devices, and other devices include embedded systems that are configured to perform one or more dedicated functions. Embedded systems of such devices that provide networking capabilities may periodically benefit from updates to the software or firmware that control such capabilities to fix bugs and/or add new functionality.

Updates to computer software and firmware can be delivered to some embedded systems with networking capabilities "over the air" (OTA) from a cloud-based wide area network (WAN) accessible service or other service provider that may deliver a digital image of the software to the embedded system. Typically, a device with an embedded system that can receive updates in this fashion is capable of communicating with the image provider and downloads the image using a secure communication link with the provider. Once a device has been deployed to an end user, future software/firmware updates rely on secure communication with the image provider. When a device cannot communicate with the image provider, a software update cannot typically be provided without returning the device to the manufacturer or performing onsite servicing of the device. This can be especially problematic when one software update causes an unforeseen problem with establishing a secure connection that, as a result, prevents using a subsequent OTA update to correct the problem. Similarly, a device with preloaded software that has been packaged, but not deployed, for an extended period of time may no longer be able to establish a secure connection with an image provider due to an expiration of connection credentials embedded in the software.

BRIEF DESCRIPTION OF THE DRAWINGS

Reference will now be made to the accompanying drawings showing example embodiments of the present application.

FIG. 1 is a block diagram depicting an example network architecture including remotely accessible embedded systems.

DETAILED DESCRIPTION OF EMBODIMENTS

Figure 2A:
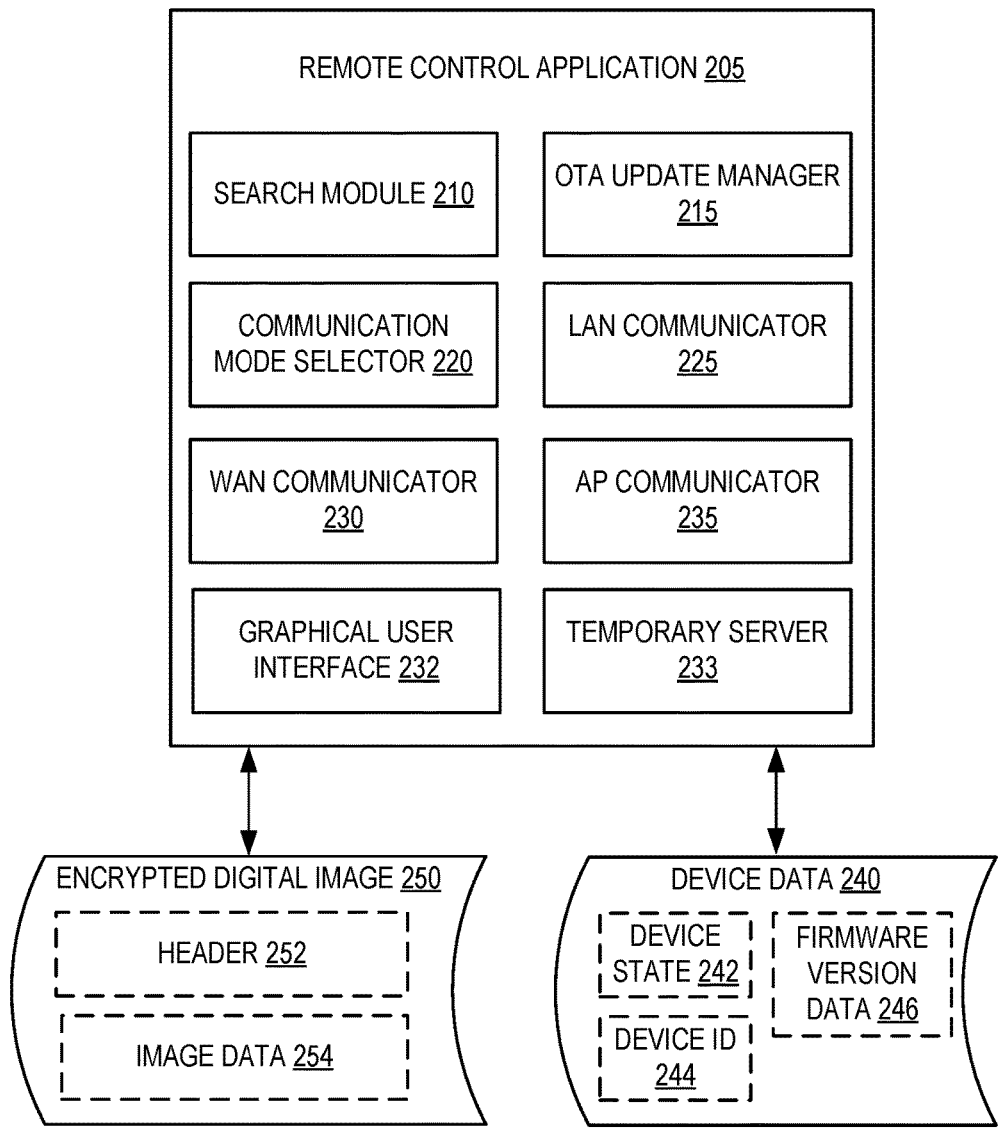
FIG. 2A is a block diagram depicting a remote control application for controlling a remotely accessible embedded system, in accordance with one embodiment of the present invention.

Embodiments are directed to an embedded system having a remote control interface and to a remote control application capable of initiating a local OTA update of firmware for the embedded system. The remote control application is capable of establishing a direct local area network (LAN) session with the embedded system and of communicating with the embedded system over the LAN session. When the embedded system is not connected to a LAN, the remote control application may establish a direct session with the embedded system if the embedded system is operating as an access point (AP). The remote control application is additionally capable of establishing a session with a wide area network (WAN) accessible service (e.g., a web service or "cloud" service) that hosts a digital image containing a firmware update for the embedded system. The WAN accessible service may encrypt the digital image specifically for a particular device, and use the remote control application as a proxy for delivering the encrypted digital image to the embedded system until secure connectivity is re-established directly between the WAN accessible service and the embedded system. Since the firmware update is encrypted for use by a specific device, the remote control application may deliver the encrypted digital image to the embedded system using an unsecured connection. This provides the ability to restore secure connectivity to an embedded system by way of a software update without physically accessing the hardware of the device that includes the embedded system.

The remote control applications described in embodiments herein may connect to the embedded system to obtain specific information about the particular device. The remote control application may then connect to the WAN accessible service to determine whether a firmware update is available for that device. The remote control application may make this determination by comparing the device related information to information received from the WAN accessible service. For example, the WAN accessible service may send the version number of the most recent firmware version for the embedded system and the remote control application may compare that with the information received from the embedded system. Alternatively, the WAN accessible service may make the determination and notify the embedded system of any available updates. The remote control application may then download an encrypted digital image containing the firmware update and store it in a storage area accessible to the remote control application. The remote control application may then re-establish the connection with the embedded system (disconnecting from the WAN accessible service if necessary) and provide the encrypted digital image to the embedded system over a local wireless connection so that it may be installed on the embedded system.

In some embodiments, the WAN accessible service generates the encrypted digital image specifically for the embedded system having a particular device serial number. The encrypted digital image may only be decrypted by the device having the particular device serial number and may not be usable by any other device of the same make or model. The WAN accessible service may encrypt the digital image on demand based on the device related information received from the remote control application. Alternatively, the WAN accessible service may generate the encrypted digital image before the device information has been received. For example, a manufacturer may identify all known devices with embedded systems using an outdated version of firmware and may notify the WAN accessible service to generate encrypted digital images for each identified device.

Referring now to the figures, FIG. 1 is a block diagram depicting an example network architecture 100 including remotely accessible embedded systems and computing devices that interact with the embedded systems. The network architecture 100 includes one or more devices 145 and a computing device 110 connected to a local area network (LAN) 165. The devices 145 are devices with embedded systems 150, and may include, for example, electrical appliances such as refrigerators, ovens, washers, driers, dishwashers, thermostats, alarms, air conditioners, televisions, radios, receivers, amplifiers, and so forth. The devices 145 may also include consumer devices such as digital watches, music players, game consoles, digital cameras, printers, and so forth. Other examples of devices 145 include stationary devices such as HVAC systems, traffic lights, factory controllers, signs, electronic billboards, sprinkler systems, and irrigation control systems, as well as medical devices. Devices 145 may also be any other type of device that includes an embedded system 150.

An embedded system 150 is a class of computing device that is embedded into another device 145 as one component of the device 145. The device 145 typically also includes other hardware, electrical and/or mechanical components that may interface with the embedded system. Embedded system 150 is typically configured to handle a particular task or set of tasks, for which the embedded system 150 may be optimized. Accordingly, the embedded system 150 may have a minimal cost and size as compared to general computing devices.

The embedded system 150 may include a communication module (not shown) that enables the embedded system 150 (and thus the device 145) to connect to the LAN 165, or alternatively, directly to computing device 110. The communication module may be configured to manage security, manage sessions, manage communications with external devices, and so forth. In one embodiment, the communication module is configured to communicate using Wi-Fi®. Alternatively, the communication module may be configured to communicate using Bluetooth®, Zigbee®, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols. One example of an embedded system is described in greater detail below with reference to FIG. 3.

In some implementations, embedded system 145 may operate as an access point (AP) to connect directly to computing device 110 over a wireless connection. When operating in 'AP' mode, embedded system 150 may connect to device 110 using the communication standards listed above. In one embodiment, embedded system 145 may operate in AP mode during initialization (e.g., the first time the embedded system is used) so that it may be configured by a user via remote control application 120 to connect with LAN 165. For example, when a user installs a new device 145 and powers it up for the first time, embedded system 150 may have no configuration information available to allow it to connect to LAN 165. Embedded system 150, responsive to determining that connection configuration information is not available, may accept connections as an AP. The user may direct remote control application 120 to connect to embedded system 150 as an AP to provide the appropriate connection credentials to embedded system 150 so that it may establish a secure connection with LAN 165 (e.g., by providing the SSID and password for a wireless access point that is connected with LAN 165). Once embedded system 150 has been configured to connect directly with LAN 165, it may then switch from AP mode to "station mode" (STA mode) where it may cease operating as an access point and begin operating as a node of the network (e.g., a station of a LAN). In one embodiment, the embedded system 150 is set to the AP mode as a default. Accordingly, resetting the device 145 may cause the embedded system 150 to return to the AP mode.

In another embodiment, embedded system 145 may operate in AP mode to facilitate receiving a local OTA update (also referred to as a LAN OTA update) from remote control application 120 as described in further detail below. A LAN OTA update may be used when embedded system 150 cannot establish a secure connection with WAN accessible service 130 via LAN 165 (e.g., when a firmware certificate has expired). Notably, when operating in AP mode, embedded system 150 may communicate with remote control application 120 over an unencrypted wireless connection. An encrypted digital image that contains firmware to be installed in the embedded system 145 may be sent from remote control application 120 to embedded system 150 over the unencrypted wireless connection. Once the firmware update has been decrypted and installed by embedded system 150, and embedded system 150 can establish a secure connection with LAN 165, embedded system 150 may then switch from AP mode back to STA mode.

Referring back to FIG. 1, the LAN 165 may include a router, switch, bridge or other network device (not shown) that enables communication between multiple devices (e.g., device 145, computing device 110, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a Wi-Fi® transceiver.

Some embedded systems 150 may not support any of the communication types supported by the network device. For example, device 145 may support Zigbee, Bluetooth, or the like. To enable such devices to connect to the LAN 165, the LAN 165 may include a gateway device (not shown) connected to the network device via one of the connection types supported by the network device (e.g., via Ethernet or Wi-Fi®). The gateway device may additionally support other communication protocols such as Zigbee, PLC and/or Bluetooth, and may translate between supported communication protocols. Accordingly, some devices 145 may connect to the LAN through the gateway device.

The LAN 165 is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to server computing devices 125-135. The server computing devices 125-135 may include a physical machine and/or a virtual machine hosted by a physical machine. The physical machine may be a rackmount server, a desktop computer, or other computing device. In one embodiment, the server computing devices 125-135 can include a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a continuous or intermittent connection) with the embedded system 150. Alternatively, the WAN accessible service 130 may periodically establish sessions with the embedded system 150. Via a session with an embedded system 150, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded system 150 may identify values or states of some or all detectable parameters of device 145 that the embedded system 150 is included in. Such values or states may change based direct user interaction with the devices. Such values or states may also change responsive to commands sent to the embedded system 150 by the WAN accessible service 130 and/or by computing device 110. By maintaining or periodically establishing sessions with the embedded systems 150, the WAN accessible service 130 may maintain up-to-date information on the states of the device 145. In some implementations, the status updates received from embedded system 150 can include device related information associated with device 145 such as a unique identifier associated with the device (e.g., a specific device serial number (DSN)), the version number of a firmware component installed on embedded system 150, or the like. WAN accessible service may use the status updates to determine when the firmware installed on embedded system 150 becomes outdated and is in need of update. This may occur when the firmware is updated to provide enhanced capabilities, to correct software errors, to replace expired encryption certificates, or the like.

The WAN accessible service 130 may additionally maintain a session (e.g., via a continuous or intermittent connection) with remote control application 120 of computing device 110. Via a session with remote control application 120, WAN accessible service 130 may receive the device related information described above in instances when embedded system 150 is unable to connect directly to WAN accessible service 130. In instances where the embedded system 150 cannot connect directly to WAN accessible service 130 (e.g., as a result of first time use of device 145, due to a problem with the version of the firmware component installed on embedded system 150, etc.), WAN accessible service may use the session with remote control application 120 as a proxy for communicating with, and delivering firmware updates to, embedded system 150.

WAN accessible service 130 may determine, based on the device related information received from the remote control application 120, that the firmware component installed on the embedded system 150 should be updated. WAN accessible service may generate an encrypted digital image that contains a firmware update for the embedded system 150 having the specific DSN for device 145, where the encrypted digital image is usable only for device 145 having that specific DSN. In one embodiment, WAN accessible service 130 may compare the specific DSN of device 145 to a list of DSNs for which an encrypted digital image is available. In another embodiment, WAN accessible service may compare the version of the firmware component installed on embedded system 150 to a list of known outdated firmware versions for which an encrypted digital image for a LAN OTA update is available and/or can be generated.

In some implementations, WAN accessible service 130 may create the encrypted digital image responsive to receiving the device related information from the remote control application 120. Alternatively, WAN accessible service 130 may create the encrypted digital image prior to receiving the device related information. WAN accessible service 130 may generate separate encrypted digital images for each specific DSN that may benefit from a firmware update. For example, WAN accessible service may receive a list of DSNs associated with devices having an old firmware version and generate a unique encrypted digital image for each of the DSNs such that each encrypted digital image can only be decrypted and installed by the device associated with the DSN for which it was encrypted.

WAN accessible service 130 may then provide the encrypted digital image to remote control application 120. WAN accessible service 120 may provide the encrypted digital image by sending a location (e.g., a uniform resource locator (URL)) of the encrypted digital image to remote control application 120 so that remote control application 120 may download the encrypted digital image from the location. In some implementations, the location of the encrypted digital image may instruct remote control application 120 to connect with a sub-component of WAN accessible service 130. Alternatively, the location may instruct remote control application 120 to connect a component outside of WAN accessible service 130, such as digital image service 140.

In one embodiment, the server computing device 135 hosts digital image service 135, which may be a web based service and/or a cloud service (e.g., a web based service hosted in a cloud computing platform). Digital image service 135 may provide the ability to host encrypted digital images for download separately from WAN accessible service 130. One example of such a service is Amazon's® Simple Storage Service (S3®). In some implementations, digital image service 140 may execute on a separate server computing device from WAN accessible service 130. Alternatively, digital image service 140 and WAN accessible service 130 may execute on the same server computing device.

Computing device 110 may include portable devices such as electronic book readers, portable digital assistants, mobile phones, laptop computers, portable media players, tablet computers, cameras, video cameras, netbooks, notebooks, and the like. Computing device 110 may also include traditionally stationary devices such as desktop computers, gaming consoles, digital video disc (DVD) players, media centers, and the like. Computing device 110 may connect to the WAN 170 and/or to the LAN 165. Computing device 110 may connect to the LAN 165 when it enters a proximity to the LAN 165 sufficient to exchange data with a network device associated with the LAN 165. This may include coming within a particular proximity to a wireless antenna associated with the LAN 165 and/or physically connecting to the LAN 165 via, for example, an Ethernet cable.

Computing device 110 can include a remote control application 120. The remote control application 120 is configured to interface with and/or control one or more of the devices 145 via the devices' embedded systems 150. In one embodiment, the computing device 110 may include separate remote control applications for each of the embedded systems of any devices in the network. Alternatively, the computing device 110 may include a single remote control application that is capable of communicating with and controlling embedded system for multiple different devices. Remote control application 120 may communicate with embedded system 150 using an encrypted connection to LAN 165, directly using an unencrypted connection with embedded system 150 operating in AP mode, or indirectly using an encrypted connection with WAN accessible service 130.

While computing device 110 is connected to WAN 170, remote control application 120 may establish a session with the WAN accessible service 130. The WAN accessible service 130 may provide an interface for indirectly controlling and monitoring the device 145. If a user desires to change a state of a device, the user may issue a command via the remote control application 120, and that command may be sent to the WAN accessible service 130. The WAN accessible service 130 may then forward the command on to the appropriate embedded system. Additionally, when the WAN accessible service 130 receives updated state information for a device from an embedded system, the WAN accessible service 130 may forward the state information on to the remote control application. This may enable users to connect to and control the device 145 from anywhere they have access to the Internet.

When a computing device 110 connects to the LAN 165, the remote control application 120 may automatically establish a direct connection to embedded system 150 if embedded system 150 is also connected to the LAN 165. While the computing device 110 is connected to the LAN 165, it may maintain a session with, and control, embedded system 150 even in the absence of a connection to WAN 170 (e.g., if LAN 165 loses a broadband Internet connection).

In an illustrative example, if the computing device is a mobile phone, then the computing device may connect to the LAN 165 using a Wi-Fi® radio. The computing device may connect to WAN 170 and WAN accessible service 130 through a connection with a wireless carrier system (e.g., though a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection).

Remote control application 120 may additionally be used as a proxy to provide firmware updates to embedded system 150 when WAN accessible service 130 cannot communicate with embedded system 150. As noted above, firmware updates may be provided to embedded system 150 during first time setup device 145, or if a firmware update is beneficial sometime after device 145 is set up to correct a problem that may prevent embedded system 150 from communicating with WAN accessible service 130.

Remote control application 120 may first establish a connection with embedded system 150 to obtain the device related information described above (e.g., a unique identifier associated with the device, firmware version, connectivity status, etc.) from embedded system 150. As noted above, during initial device setup, remote control application 120 may connect with embedded system 150 via a direct connection as it operates in AP mode. Otherwise, remote control application may connect with embedded system 150 via LAN 165. Once the device related information has been received, remote control application 120 may then disconnect from embedded system 150. In instances where remote control application 120 has connected to embedded system 150 operating in AP mode, remote control application 120 may disconnect the AP connection. In instances where remote control application 120 has connected to embedded system 150 operating in STA mode while connected to LAN 165, remote control application 120 may terminate the communication session with embedded system 150 without disconnecting completely from LAN 165. Alternatively, the communication session with embedded system 150 over LAN 165 may remain active.

Remote control application 120 may connect to WAN accessible service 130. As noted above, this connection may be established either via LAN 165 (e.g., using Wi-Fi®), or via WAN 170 (e.g., using a wireless carrier system). Remote control application 120 may then send the device related information to WAN accessible service 130. In some implementations, WAN accessible service 130 may determine whether a firmware update is available for embedded system 150 using the device related information sent by remote control application 120 as described above. In other implementations, remote control application 120 may make the determination that a firmware update is to be performed.

In one embodiment, remote control application 120 may determine, using status information received from embedded system 150, whether the embedded system is able to connect to WAN accessible service 130. Responsive to making this determination, remote control application 120 may send additional information to WAN accessible service 130. For example, remote control application 120 may send a notification that the embedded system is unable to connect to the WAN accessible service. Alternatively, remote control application 120 may send a query to WAN accessible service 130 asking whether a firmware update is available for embedded system 150.

In some implementations, remote control application 120 may receive information from WAN accessible service 130 that includes the newest firmware version number for the embedded system 150. Remote control application 120 may then compare this information with the device related information received from embedded system 150. If over the air update is configured to be initiated by remote control application 120 to update the embedded system, remote control application may then send a request to WAN accessible service 130 for the new firmware.

Once the determination has been made that a LAN OTA firmware update for embedded system 150 is available, remote control application 120 may then receive an encrypted digital image containing the updated firmware from WAN accessible service 130. As noted above, the encrypted digital image is encrypted specifically for device 145 having the unique identifier included in the device related information sent to WAN accessible service 130, and is unusable on other devices that are the same model as device 145. In some implementations, remote control application 120 first receives the location information from WAN accessible service 130 that indicates where the encrypted digital image is stored. This location may be a storage location on the same server computing device as WAN accessible service 130. Alternatively, the location may be a storage location on another server computing device, such as that accessible to digital image service 140. Remote control application 120 may then retrieve the encrypted digital image from the received location and store it in a storage area of the computing device 110. The storage area may be persistent storage, flash storage, device memory, or the like.

Once remote control application 120 has stored the encrypted digital image on computing device 110, it may then initiate an over the air update of the firmware of embedded system 150 using the encrypted digital image. Remote control application 120 may first reestablish a connection with embedded system 150. If embedded system 150 is still operating in AP mode, remote control application 120 may disconnect from WAN accessible service 130 and establish a new connection with embedded system 150 as an access point. If embedded system 150 is operating in STA mode, remote control application may reactivate the session already established with embedded system 150 using the LAN 165 connection.

Remote control application 120 may then send location information to embedded system 150 that includes a reference to the storage area of computing device 110 where the encrypted digital image is stored. In some implementations, the location information may be a URL that can access an addressable portion of the storage area of computing device 110. Remote control application 120 may then initiate a temporary server process on computing device 110 to permit embedded system 150 to retrieve the encrypted digital image from the storage area of computing device 110. Remote control application 120 may receive a status from embedded system 150 that indicates whether the encrypted digital image was successfully retrieved by the embedded system 150. Remote control application 120 may then forward the status to WAN accessible service 130. If embedded system 150 is operating in STA mode, remote control application 120 may utilize the session already established with WAN accessible service 130. If embedded system 150 is operating in AP mode, remote control application 120 may disconnect from embedded system 150 and establish another connection with WAN accessible service 130 as noted above.

FIG. 2A is a block diagram of an example embodiment of a remote control application 205. The remote control application 205 may be a program or library that is executed by a processing device (e.g., by processors of computing device 110 of FIG. 1). The remote control application 205 may be programmed to run on various operating systems, such as Windows® operating systems, Unix® operating systems, iOS® operating systems, Android® operating systems and Java® operating systems to name a few. The remote control application 205 may also be configured as firmware, or as hardware, or as some combination of software, firmware and/or hardware. In one embodiment, the remote control application 205 includes a graphical user interface (GUI) 232, a search module 210, an over the air (OTA) update manager 215, a communication mode selector 220, a local area network (LAN) communicator 225, a wide area network (WAN) communicator 230, an access point (AP) communicator 235, and a temporary server 233. In other embodiments, the functionality of some or all of the GUI 232, the search module 210, the OTA update manager 215, the communication mode selector 220, the LAN communicator 225, the WAN communicator 230, the AP communicator 235, and/or the temporary server 233 may be combined into a single module or divided into additional modules.

The remote control application 205 may also have access to device data 240, which may include a device ID 242 for a device that the remote control application 205 is registered with, a last known device state 244 of the device, and a firmware version 246 that denotes the version of firmware installed on the device that remote control application is registered with. In one embodiment, the device ID 244 includes a media access control (MAC) address of the embedded system. Alternatively, the device ID 244 may be a unique identifier assigned to the embedded system (or to a communication module in the embedded system) that is separate from the MAC address. The device data 240 may be stored by a computing device that runs the remote control application 205 and/or may be stored by a remote WAN accessible service.

Graphical user interface (GUI) 232 enables users to interact with and control devices in an intuitive and user-friendly manner. GUI 232 may provide a collection of graphical icons, visual indicators, buttons, toggles, sliders, and so forth that represent states and values of different parameters for the devices as well as controls for changing those states and values. A user may interact with the GUI 232 to cause the remote control application to generate notifications, commands, property updates and other messages, as well as check for available firmware updates, and initiate an OTA update of firmware for the devices represented in the GUI.

Search module 210 searches for embedded systems that the remote control application 205 has been registered with previously, or for new embedded systems with which the remote control application 205 intends to register. In one embodiment, search module 210 initiates a search each time the computing device executing the remote control application 205 connects to a LAN. In one embodiment, search module 210 first attempts to connect to the device using the last known IP address of the device. Search module 210 may send a ping message to the IP address. If a response is received from the device, then search module 210 determines that the device shares a LAN connection with remote control application 205. If no response is received from the device, or a response is received from an unexpected different device, then search module may use multicast domain name system (mDNS) to locate the device. Accordingly, search module 210 may broadcast a query message asking for any device on the network having the device ID 248 to identify itself. If the device is on the LAN, then the embedded system of the device will multicast its IP address over the LAN. This then identifies the IP address of the embedded system to search module 210. If the device is not on the LAN (e.g., if the device has not yet been registered with the remote control application 205), search module 210 may search for a device with an embedded system operating as an independent access point (AP).

Communication mode selector 220 determines whether the remote control application 205 will communicate with the embedded system of the device directly over the LAN, directly with the embedded system as an access point (AP), or indirectly using a WAN accessible service as a proxy. If search module 210 identified the device as being on the same LAN as the remote control application 205, then communication mode selector may select a direct LAN communication mode. Additionally, in some instances, to obtain updated firmware for a device that cannot communicate with the WAN accessible service, communication mode selector 220 could select WAN communication mode to obtain the updated firmware. If search module 210 determines that the device is operating as an AP (e.g., when the device is being used for the first time, if the user resets the device due to system problem, etc.), then communication mode selector 220 may select an AP communication mode.

If a LAN communication mode is selected for communication with a device, LAN communicator 225 establishes a direct LAN connection and session with the embedded system of the device. If an AP communication mode is selected for communication with the device, AP communicator 235 establishes a direct connection and session with the embedded system of the device. The AP direct connection may be established using wireless networking protocols such as Wi-Fi®, Bluetooth®, etc. Once a connection with a device has been established via LAN communicator 225 or AP communicator 235, the applicable communicator module may obtain device related information from the device (e.g., the unique identifier associated with the device, the firmware version that is stored on the embedded system of the device, the connectivity status of the device, etc.). The communicator may store the device ID as device ID 244, the connectivity status of the device as device state 244, and the current version of the firmware on the embedded system in firmware version data 246 of device data 240.

Once the device related information has been received by the applicable communicator module, remote control application 205 may invoke OTA update manager 215 to determine if a firmware update is available for the embedded system of the device. OTA update manager 215 may connect to a WAN accessible service to determine if a firmware update is available for the embedded system of the device. To do so, OTA update manager may invoke one of the communication modules to disconnect from the device prior to initiating a connection with the WAN accessible service. In instances where remote control application 205 has connected to the embedded system operating in AP mode, OTA update manager 215 may invoke AP communicator to disconnect the AP connection. In instances where remote control application 205 has connected to the embedded system via a LAN connection, OTA update manager 215 may invoke LAN communicator 225 to terminate the communication session with the embedded system without disconnecting completely from the LAN. Alternatively, LAN communicator 225 may leave the communication session with embedded system over the LAN connection active.

OTA update manager 215 may then invoke WAN communicator 230 to establish a connection to the WAN accessible service. WAN communicator 230 may provide credentials of a user and/or of the remote control application to the WAN accessible service. Responsive to WAN communicator 230 providing the proper credentials, the WAN accessible service may establish a session with remote control application 205. In one embodiment, secure sockets layer (SSL) or other security protocols are used for the secure session. Once the session is established, WAN communicator 230 may provide the WAN accessible service with the device related information (e.g., the unique identifier of the device) described above. In some implementations, the WAN accessible service may then determine whether a firmware update is available for the embedded system based on the device related information. In other implementations, the WAN accessible service may then provide WAN communicator 230 with information associated with the device that is known to the WAN accessible service so that OTA update manager 215 may make the determination that a firmware update is needed.

In one embodiment, WAN communicator 230 may receive information from the WAN accessible service that includes the newest firmware version number for the embedded system 150, and store the information in device data 240. OTA update manager 215 may then compare this information with the device related information received from the embedded system. If over the air update is configured to be initiated by remote control application 205 to update the embedded system, OTA update manager 215 may then send a request to the WAN accessible service for the new firmware.

In one embodiment, OTA update manager 215 may determine, using status information received from embedded system 150, whether the embedded system is able to connect to the WAN accessible service. For example, OTA update manager 215 may use the status information stored in device state 242 received from the embedded device that indicates the embedded system's connectivity status (e.g., a status indicator, a data/timestamp of the last successful communication with the WAN accessible service, etc.). Responsive to making this determination, OTA update manager 215 may invoke WAN communicator 230 to send additional information to the WAN accessible service. For example, WAN communicator 230 may send a notification that the embedded system is unable to connect to the WAN accessible service. Alternatively, WAN communicator 230 may send a query to WAN accessible service 130 asking whether a firmware update is available for the embedded system.

Once the determination has been made that a firmware update for the embedded system is available, WAN communicator 230 may then receive an encrypted digital image containing the updated firmware from the WAN accessible service. The encrypted digital image is encrypted specifically for the device having the unique identifier included in the device related information sent to the WAN accessible service, and is unusable on other devices that are the same model as device 145. For example, for an electronic appliance such as a refrigerator, the encrypted digital image can be generated for a specific refrigerator that may only be used by that refrigerator. Any other refrigerators with the same model number will not be able to decrypt and install the image.

In some implementations, OTA update manager 215 first receives the location information from WAN accessible service that indicates where the encrypted digital image is stored. This location may be a storage location on the same server computing device as the WAN accessible service. Alternatively, the location may be a storage location on another server computing device that hosts an image delivery service. OTA update manager 215 may then retrieve the encrypted digital image from the received location and store it in a storage area of the computing device, such as encrypted digital image 250. The storage area may be persistent storage, flash storage, device memory, or the like.

Encrypted digital image 250 may include a header 252 and image data 254. As noted above encrypted digital image 250 may be encrypted by the WAN accessible service for use by a specific device that is unusable by any other device. Header 252 may contain information used by the device to decrypt the image data 254. Encrypted digital image 250 is described in further detail below with respect to FIG. 2A.

Once OTA update manager 215 has stored encrypted digital image 250, it may then initiate an over the air update of the firmware of embedded system using encrypted digital image 250. OTA update manager 215 may first reestablish a connection with the embedded system of the device. OTA update manager 215 may invoke communication mode selector 220 to determine the communication mode of the device that should be used. In instances where remote control application 205 initially connected to the embedded system operating in AP mode, OTA update manager 215 may signal WAN communicator 230 to disconnect from the WAN accessible service and may invoke AP communicator 235 to establish a new connection with the embedded system as an access point. In instances where remote control application 205 initially connected to the embedded system operating in AP mode, OTA update manager 215 may signal WAN communicator 230 to disconnect from the WAN accessible service and may invoke AP communicator 235 to establish a new connection with the embedded system as an access point. In instances where remote control application 205 has connected to the embedded system via a LAN connection, OTA update manager 215 may signal LAN communicator 225 to reactivate the session already established with the embedded system using the LAN connection.

OTA update manager 215 may then send location information to the embedded system that includes a reference to the storage area where encrypted digital image 250 is stored. In some implementations, the location information may be a URL that can access an addressable portion of the storage area that contains encrypted digital image 250. OTA update manager 215 may then initiate temporary server 233 to permit the embedded system to retrieve the encrypted digital image 250 from the storage area. In one embodiment, temporary server 233 may be a hypertext transfer protocol (HTTP) process. In one embodiment, temporary server 233 may be a file transfer protocol (FTP) process. Temporary server process 233 can accept an incoming session request from the embedded system process to retrieve the encrypted digital image 250.

OTA update manager 215 may then receive a status from the embedded system that indicates whether the encrypted digital image was successfully retrieved and installed. OTA update manager 215 may then forward the status to the WAN accessible service. For example, if the embedded system retrieves and decrypts the digital image and subsequently determines that the decrypted firmware update has been corrupted (e.g., has an incorrect digital signature), the embedded system may indicate this in the status. In some implementations, the WAN accessible service may determine, using the status information, that the encrypted digital image should be regenerated and that the OTA update of the firmware for the embedded system be repeated. If the embedded system is operating in STA mode, OTA update manager 215 may invoke LAN communicator 255 or WAN communicator 230 to utilize the session already established with the WAN accessible service. If the embedded system is operating in AP mode, OTA update manager 215 may again invoke AP communicator to disconnect from the embedded system and then invoke WAN communicator 230 to establish another connection with the WAN accessible service as noted above.

Notably, since the encrypted digital image 250 is encrypted specifically for one specific embedded system (on one specific physical device), the encrypted digital image 250 may be delivered to the embedded system via an unencrypted connection. Thus, in instances where a secure connection cannot be established between the embedded system and the WAN accessible service, critical firmware updates may be provided to the embedded system by a user without the need to involve technical service personnel.

Figure 2B:
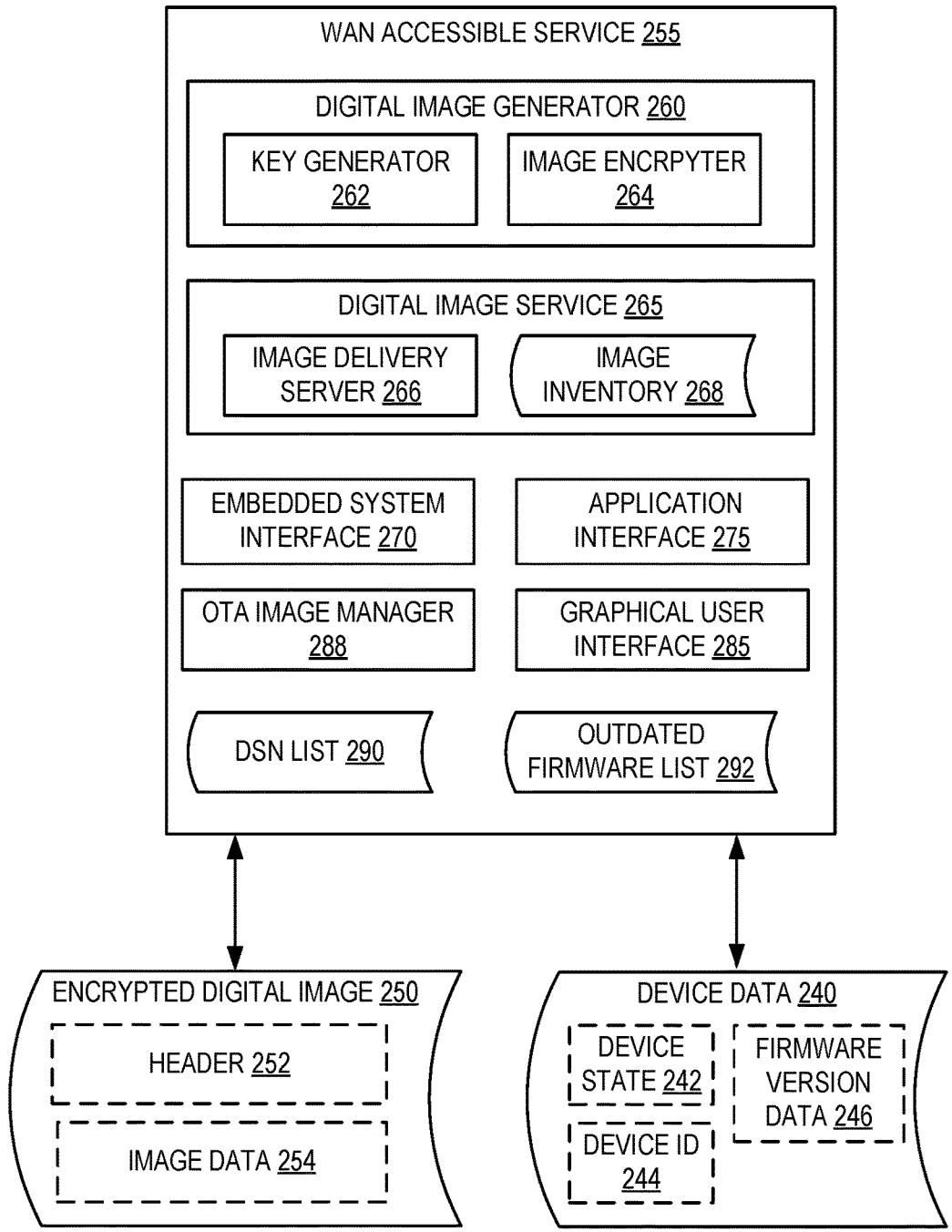
FIG. 2B is a block diagram of an example embodiment of a wide area network (WAN) accessible service.

FIG. 2B is a block diagram of an example embodiment of a WAN accessible service 255, which in one embodiment corresponds to WAN accessible service 130 of FIG. 1. WAN accessible service 255 may include a digital image generator 260, a digital image service 265, an embedded system interface 270, an application interface 275, a graphical user interface 285 and an OTA image manager 288. Alternatively, the functionality of one or more of the digital image generator 260, digital image service 265, embedded system interface 270, application interface 275, graphical user interface 285 and OTA image manager 288 may be combined into a single module or divided into multiple sub-modules. While FIG. 2B depicts digital image service 265 as a component of WAN accessible service 255, in some implementations digital image service 265 may separate from WAN accessible service 255. Digital image service 265 may be included on the same sever computing device as WAN accessible service 255, or may be included on a separate server computing device.

Embedded system interface 270 is responsible for connecting to embedded systems. WAN accessible service 255 may establish secure sessions with and/or maintain secure sessions with one or many embedded systems. Via the active sessions, embedded system interface 270 may send notifications, property updates and/or control messages to the embedded systems and receive acknowledgments, status updates (e.g., of a device state 242 and/or local IP address 250) and other information (e.g., a device ID 248) from the embedded systems.

Application interface 275 is responsible for connecting to remote control applications. Application interface 275 may enable users to log in to user accounts on WAN accessible service 255 by providing the proper credentials. A secure session may be established with the remote control applications as a part of the log in process. Once a secure session is established (e.g., via SSL) and a remote control application is logged into a particular user account, application interface 275 may provide the remote control application with updated status information for embedded systems to which the remote control application is registered. Additionally, application interface 275 may receive commands from the remote control application for modifying a state of (or otherwise controlling) one or more embedded systems with which the remote control application is registered. Application interface 275 may receive device related information associated with an embedded system, such as a unique identifier associated with the device (e.g., a specific device serial number (DSN)), the version number of a firmware component installed on an embedded system, or the like. Application interface 275 may store the device related information in device 240 so that it may be used by OTA image manager 288 to determine if a firmware update is available for installation on an embedded system.

Graphical user interface 285 may be a web interface that is accessible from computing devices using a web browser. Accordingly, computing devices that do not include a remote control application may still log into a user account for monitoring and/or controlling embedded systems via the graphical user interface 285.

Digital image generator 260 may generate an encrypted digital image (e.g., encrypted digital image 250) to be installed on an embedded system. In one embodiment, digital image generator 250 may generate encrypted digital image 250 responsive to application interface 275 receiving the device related information as described above. In one embodiment, digital image generator may identify a list of devices that each have an embedded system eligible for a firmware update. For example, digital image generator 260 may receive a list of DSNs, all of the same model type (e.g., all a particular model of refrigerator), where each DSN is associated with a device containing an embedded system with an outdated version of firmware installed. Digital image generator 260 may then generate a unique encrypted digital image 250 for the embedded system of each device on the list that is only usable for the device for which it was generated.

Digital image generator 260 may generate the encrypted digital image 250 using combination of asymmetric encryption (e.g., RSA encryption) and symmetric encryption (e.g., Advance Encryption Standard (AES)) techniques to minimize the complexity of the image while maximizing its security. Key generator 262 may first generate a single-use key for symmetric encryption of image data 254. Key generator 262 may use a random number generator, pseudorandom number generator or other key generation mechanism to generate the single use key. In one embodiment, key generator 262 may generate a 256 bit random number for the single-use key (e.g., for 256 bit AES symmetric encryption). Digital image generator 260 may then generate header 252 that contains metadata for image 254 (such as version number information), the single-use key, and a digital signature for the encrypted digital image. In some implementations, digital image generator 260 may also calculate a hash (e.g., an SHA has) of the image data 254 before it is encrypted. The hash information may then be included in the header 252, which can be used by an embedded system to validate an image after it has been decrypted.

Digital image generator 260 may then identify a private encryption key associated with the DSN of the device that includes the embedded system for which the encrypted digital image 250 will be generated. Image encrypter 264 may be invoked to asymmetrically encrypt a header 252 for the encrypted digital image 250 using the private key. Thus, only the DSN with the corresponding public key may successfully decrypt the header 254 to obtain the single-use key for decrypting a body of the image (referred to as image data 254). Image encrypter 264 may be invoked to symmetrically encrypt the image data 254 using the single-use key contained in header 252. The image data 254 may be encrypted before or after the header 252 is encrypted. Digital image generator 260 may then combine the encrypted header 252 and the encrypted image data 254 to create encrypted digital image 250.

Digital image service 265 may provide the encrypted digital image 250 to a remote control application by maintaining a server process to which the remote control application may connect to retrieve the encrypted digital image 250. Digital image service 265 may include image delivery server 266 and image inventory 268. In one embodiment, image delivery server 266 may be a hypertext transfer protocol (HTTP) process. In one embodiment, image delivery server 266 may be a file transfer protocol (FTP) process. Image delivery server 266 can accept an incoming session request from the remote control application to retrieve the encrypted digital image 250. Image inventory 268 may contain the location information for each encrypted digital image available for download. For example, image inventory 268 may contain the URLs associated with each available encrypted digital image 250 that may be sent to a requesting remote control application so that the remote control application may initiate the download.

OTA image manager 288 may determine whether an encrypted digital image is available for the embedded system of a particular device. In some implementations, OTA image manager 288 may use the device related information received by application interface 275 to make this determination. In one embodiment, OTA image manager 288 may compare the specific DSN of the device received in the device related information to DSN list 290 that contains a list of DSNs for which an encrypted digital image is available. If the DSN of the device matches one of the entries in DSN list 290, then OTA image manager 288 may identify the corresponding encrypted digital image 250 for the DSN from the matching entry on the list and may add it to image inventory 268 for distribution. In another embodiment, OTA image manager 288 may compare the version of the firmware component installed on the embedded system of the device to outdated firmware list 292 that contains a list of known outdated firmware versions for which an encrypted digital image is available. If the version number of the device matches one of the entries in outdated firmware list 292, then OTA image manager 288 may identify the corresponding encrypted digital image 250 from the matching entry on the list and may add it to image inventory 268 for distribution.

Figure 3:
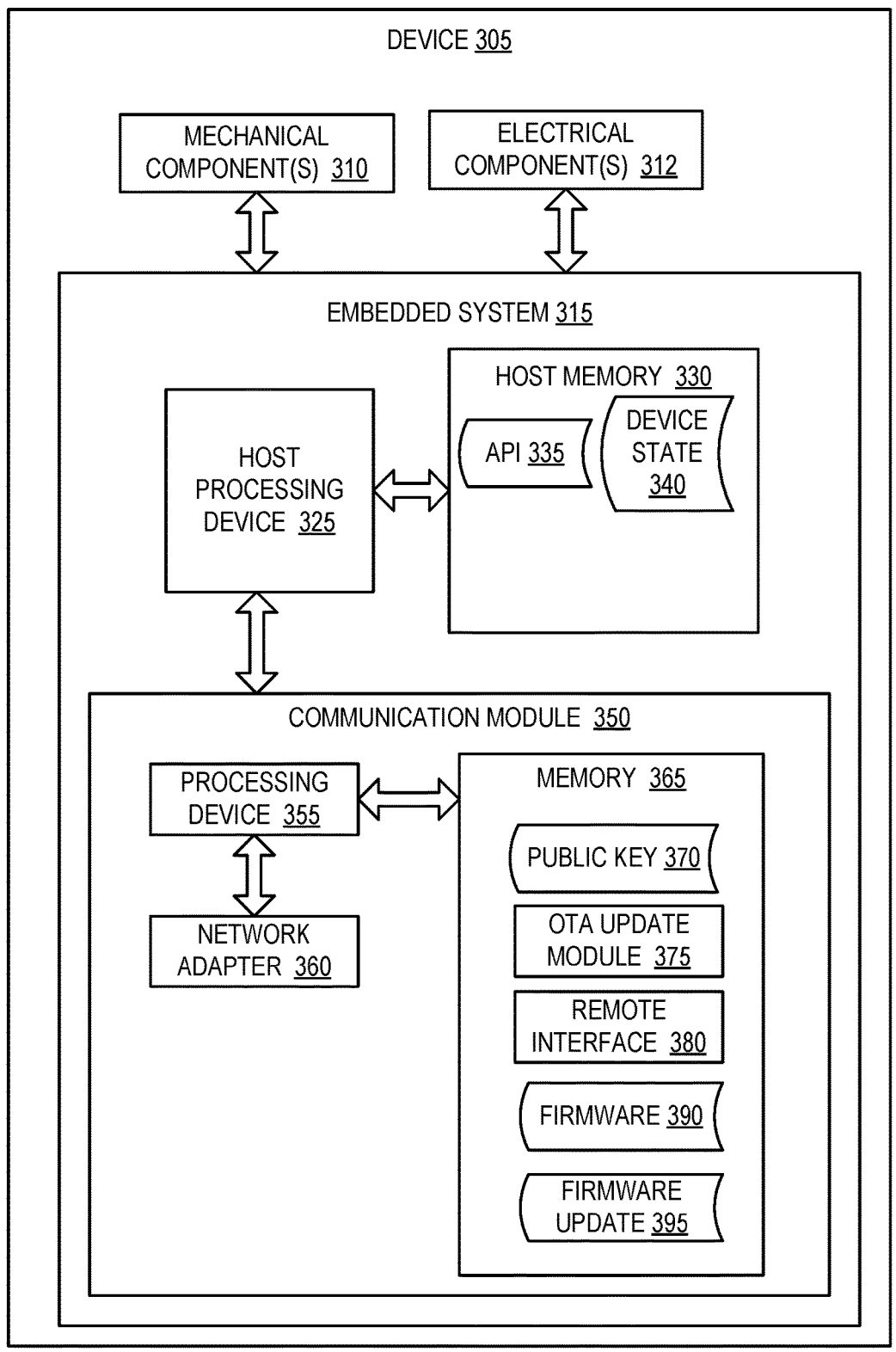
FIG. 3 is a block diagram of an example device having a remotely accessible embedded system.

FIG. 3 is a block diagram of an example device 305 having a remotely accessible embedded system 315. The device 305 may include any of the aforementioned types of devices having an embedded system, and in one embodiment corresponds to a device 145 of FIG. 1. In one embodiment, the device 305 includes mechanical components 310, electrical components 312 and an embedded system 315. The electrical components 312 and/or mechanical components 310 may include sensors, programmable logic controllers (PLCs), switches, motors, valves, actuators, and so forth.

The embedded system 315 may include a host processing device 325, a host memory 330 and/or a communication module 350 coupled to the host processing device 325. The embedded system 315 may also include numerous other components that are not shown herein. Examples of such additional components may include light emitting diodes (LEDs), a power supply regulator, fuses, ports, a user interface, digital to analog (D/A) converters, analog to digital (A/D) converters, field programmable gate arrays (FPGAs), application specific integrated circuits (ASICs), and so on.

Host processing device 325 may be a microcontroller or a digital signal processor (DSP) in one embodiment. Host processing device 325 may alternatively or additionally include a programmable logic controller (PLC), a field programmable gate array (FPGA) or a complex programmable logic device (CPLD). The host processing device 325 may be configured to perform specific functions related to the operation and control of the device 305.

Host memory 330 may include random access memory (RAM), read only memory (ROM), one time programmable (OTP) ROM, Flash (e.g., NOR Flash), or other types of memory. Host memory 330 may store an application programming interface (API) 335 for the communication module 350. The API 335 may enable the host processing device 325 to send commands and/or data to and receive commands and/or data from communication module 350.

Host memory 330 may additionally include a device state 340 for the device 305. The device state 340 may include a present device state, historical device state, and/or changes made to the device state over a particular period. For example, device state 340 in one embodiment includes changes made to the device's state since a connection to a WAN accessible service was lost. Device state 340 may store the current connectivity state of device 305 with the WAN accessible service (active, inactive, etc.) as well as the version number information of any firmware 390 installed on communication module 350 of device 305. Host memory 330 may also include firmware for the host processing device 325 that configures the host processing device to perform one or more operations that are specific to device 305.

In some embodiments, the host memory 330 may be integrated into the host processing device 325. For example, microcontrollers typically include a processor core, memory and programmable input/output peripherals. Accordingly, if the host processing device 325 is a microcontroller, then host memory 330 may be a memory of host processing device 325.

Communication module 350 may be an integrated circuit (IC) that is configured to be coupled to host processing device 325 of embedded system 315. Communication module 350 may be provided by a third party to a manufacturer of the device along with the API 335, and may enable network capability and remote control capability to be easily added to the device 305. The communication module 350 may include its own processing device 355, a memory 365 and/or a network adapter 360. The processing device 355 may be a microcontroller, a system on a chip (SoC), a digital signal processor (DSP), a programmable logic controller (PLC), a microprocessor or programmable logic device such as a field-programmable gate array (FPGA) or a complex programmable logic device (CPLD). The memory may include a non-volatile memory (e.g., RAM) and/or a volatile memory (e.g., ROM, Flash, etc.). In one embodiment, memory 365 is integrated into processing device 355.

Memory 365 may store a public key 370 and for use in decrypting an encrypted digital image that may be received via an OTA update from a remote control application (such as remote control application 120 of FIG. 1). Memory 365 may also store firmware 390 for the processing device 355, such as firmware that includes instructions for a remote interface 382.

Network adapter 360 may be a wired network adapter (e.g., an Ethernet adapter) or a wireless network adapter (e.g., a Wi-Fi® adapter or other wireless local area network (WLAN) adapter). Network adapter 360 may also be configured to provide connection to a network or other devices using Zigbee, PLC, Bluetooth, 6LowPAN, or other communication protocols. Network adapter 360 may receive notifications and other messages from a WAN accessible service and/or remote control applications. Network adapter 360 may additional send outgoing messages to the WAN accessible service and/or to remote control applications.

Remote interface 380 may be executed by processing device 355 to operate on messages and notifications received from a WAN accessible service and/or remote control applications. In some implementations, if device 305 is unable to communicate with a WAN accessible service, communication module 350 of embedded system 315 may operate as an access point (in AP mode) to communicate with the remote control application directly.

Remote interface 380 may also determine if there are sufficient resources to establish a session with the remote control application. For example, remote interface 380 may include sufficient resources to maintain LAN sessions with a particular number of remote control applications in one embodiment. In such an instance, remote interface 380 would determine whether the particular number of remote control applications already have sessions with the embedded system. If so, remote interface would not establish a connection with the new remote control application from which the notification was received. If there were fewer than the particular number of remote control applications with LAN sessions, then remote interface 380 would initiate session establishment.

After a session has been established, remote interface 380 may receive notifications from the remote control application and from any other remote control applications that also have active sessions. Additionally, remote interface 380 may receive notifications from the WAN accessible service. Each of the notifications may indicate that a sender of the notification has a message (e.g., a command or property update) for the embedded system 315. Remote interface 380 may or may not send acknowledgements of receipt of the notifications to senders. Additionally, remote interface 380 may place the notifications into a queue based on an order that they were received, and may process the notifications on a first in first out (FIFO) basis.

When a notification is to be processed, remote interface 382 sends a message to the sender of the notification requesting a message. The remote interface 382 then receives the requested message, decrypts it, and forwards any commands or property updates from the message on to host processing device 325. Host processing device 325 may perform one or more operations based on the commands, which may cause a state of one or more parameters or properties for the device 305 to change. The host processing device 325 may report the changed device state to processing device 355.

In one embodiment, a notification may be a request from a remote control application for device related information in order to determine if a firmware update is available for embedded system 315. Remote interface 380 may retrieve the requested information from device state 340 and return it to the requesting remote control application.

In one embodiment, a notification may be received from a remote control application that a firmware update is available to be retrieved from the remote control application via an OTA update. The notification may include the location of an encrypted digital image stored on the device executing the remote control application (e.g., as further described above with respect to FIG. 2). Remote interface 380 may then invoke OTA update module 375 to complete the download and decryption of the encrypted digital image.

OTA update module 375 may retrieve the encrypted digital image from the location specified in the notification, and store it in memory 365 as firmware update 395. In some implementations, firmware update 395 may be downloaded and stored in a single operation. Alternatively, firmware update 395 may be downloaded in pieces, and subsequently stored one piece at a time. OTA update module 375 may first decrypt the header of the encrypted digital image using the public key 370. OTA update module 370 may then use the single-use key in the header to decrypt the image data for firmware update 395. Subsequently, firmware update 395 may be installed to replace firmware 390.

In some implementations, if the encrypted digital image is downloaded in pieces, each piece may be decrypted on the fly in place and a signature may be computed for the downloaded piece. The signature may be a computed SHA hash of the image as it is downloaded from the remote control application that may be used to verify the authenticity of the image. For example, the encrypted image may be downloaded, then decrypted and stored in place (e.g., the decrypted data is stored such that it replaces the encrypted data in memory). Once the download has completed, OTA update module 375 verifies that the computed SHA hash value for firmware update 395 matches the hash value included in the header of the encrypted digital image. If so, the firmware update 395 may be installed on the device. Otherwise, the firmware update 395 may be discarded and a status update message may be sent to the remote control application to indicate that the encrypted digital image was invalid.

Remote interface 382 may generate a status update message, and may send it to the connected remote control applications and to the WAN accessible service if an auto echo mode is enabled. If an auto echo mode is disabled, then the host processing device may determine which, if any, remote control applications and/or WAN accessible services will be notified of the state update, as well as when such updates will be distributed. For example, the host processing device 325 may determine to actively update LAN sessions for every state change and only update the WAN accessible service with latest information once a day. The WAN accessible service may then forward the status update to any remote control applications that are not directly connected to embedded system 315 over the LAN.

Processing device 355 may keep track of every remote control application and WAN accessible service it has an active session with. Reachability to the WAN accessible service may be detected in numerous ways. For example, remote interface 380 may attempt to POST to the WAN accessible service with status updates and/or may attempt to ping the WAN accessible service. If a POST attempt and/or ping attempt fails after one or more retries, processing device 355 may inform host processing device 325 that the WAN accessible service is unreachable. Remote interface 382 may then periodically attempt to reconnect to the WAN accessible service (e.g., every 5 minutes, every 10 minutes, or at some other interval).

In one embodiment, processing device 355 notifies host processing device 325 each time communication module 350 connects to or loses connection with a destination (e.g., with WAN accessible service or a remote control application). The host processing device 325 may use this information to keep track of WAN accessible service reachability and record which property updates/state changes have not been reported to the WAN accessible service in device state 340. Once a connection to the WAN accessible service is reestablished, host processing device 325 or processing device 355 may send all updates that the WAN accessible service missed.

FIGS. 4-7 are flow diagrams showing various methods of providing an update for firmware for an embedded system via an OTA update from a remote control application. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a remote control application, such as remote control application 205 of FIG. 2A.

Figure 4:
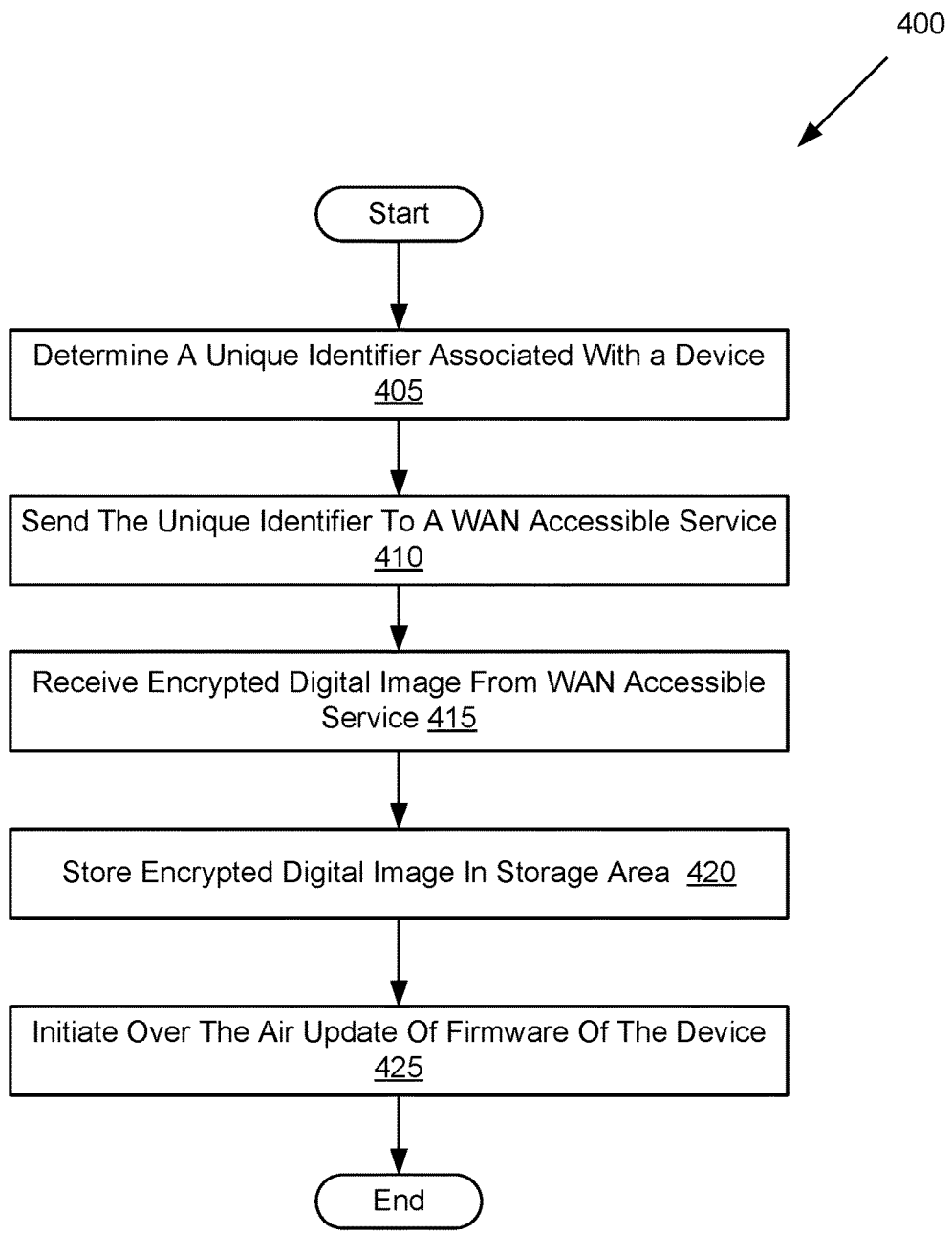
FIG. 4 is a flow chart of an example method of performing a local over the air update of firmware on an embedded system.

FIG. 4 is a flow chart of an example method 400 of performing a LAN over the air update of firmware on an embedded system. At block 405 of method 400, processing logic determines a unique identifier associated with a device that includes an embedded system. Processing logic may determine the identifier by requesting device related information from the embedded system.

At block 410, processing logic sends the unique identifier to a wide area network (WAN) accessible service. At block 415, processing logic receives an encrypted digital image from the WAN accessible service. The encrypted digital image may be made up of a firmware update for the device with the embedded system, where the encrypted digital image is encrypted specifically for the device having the unique identifier sent to the WAN accessible service at block 410, and is unusable on other devices that have the same model as the device with the embedded system.

At block 420, processing logic stores the encrypted digital image in a storage area. At block 425, processing logic initiates a LAN over the air update of firmware of the deice using the encrypted digital image. One embodiment of initiating an over the air update is set forth below with reference to FIG. 7. After block 425, the method of FIG. 4 terminates.

Figure 5:
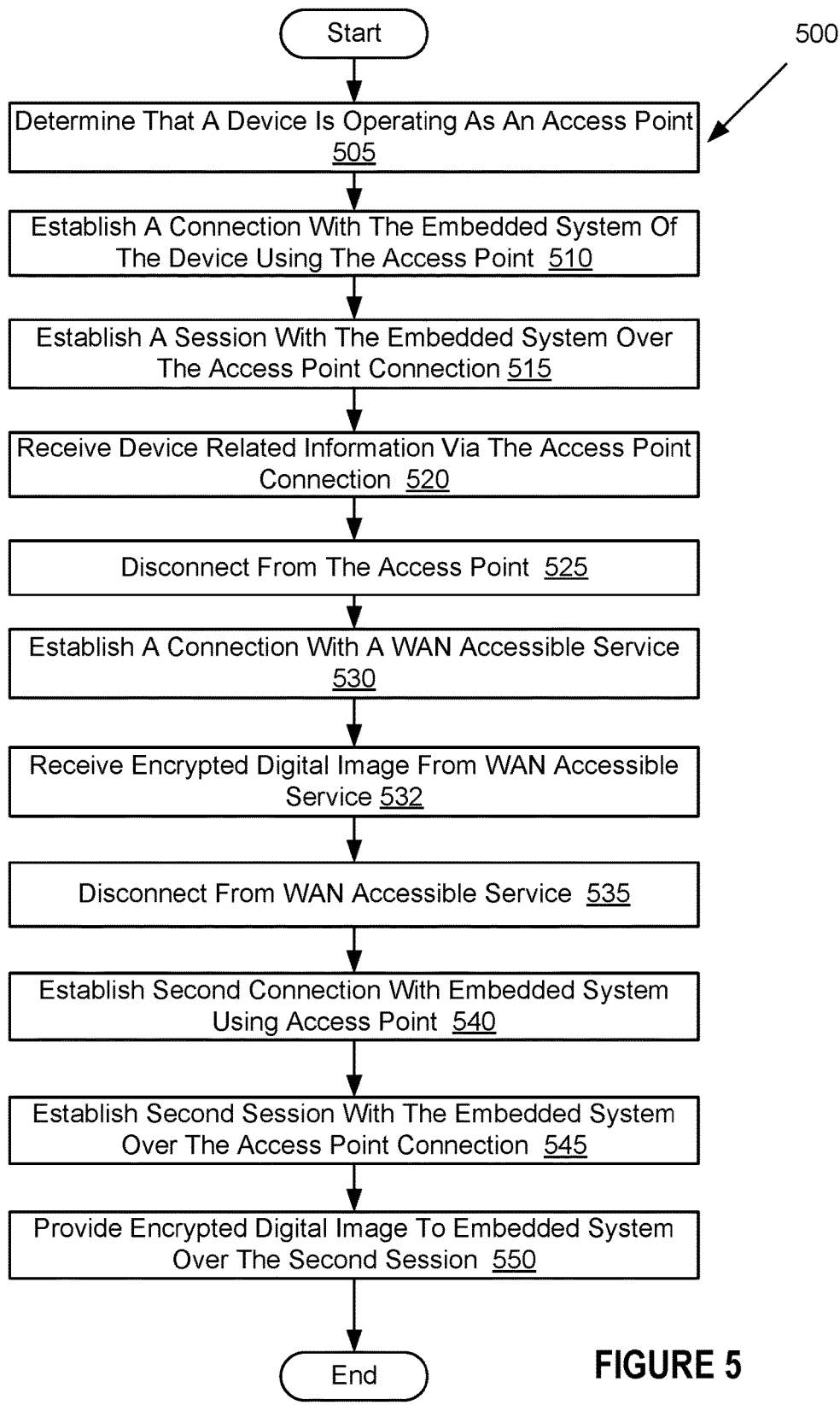
FIG. 5 is a flow chart of an example method of connecting to a device with an embedded system operating as an access point.

FIG. 5 is a flow chart of an example method 500 of connecting to a device with an embedded system operating as an access point.

At block 505 of method 500, processing logic determines that a device with an embedded system is operating as an access point. At block 510, processing logic establishes a connection with the embedded system using the access point. At block 515, processing logic establishes a session with the embedded system over the access point connection. At block 520, processing logic receives device related information via the access point connection. At block 525, processing logic disconnects from the access point.

At block 530, processing logic establishes a connection with a WAN accessible service. At block 532, processing logic receives an encrypted digital image from the WAN accessible service. The encrypted digital image may be made up of a firmware update for the device with the embedded system, where the encrypted digital image is encrypted specifically for the device, and is unusable on other devices that have the same model as the device with the embedded system. In some implementations, processing logic may send the WAN accessible service the device related information received at block 520 so that the WAN accessible service may determine whether an encrypted digital is available for the embedded system.

At block 535, processing logic disconnects from the WAN accessible service. At block 540, processing logic establishes a second connection with the embedded system using the access point. At block 545, processing logic establishes a second session with the embedded system over the access point connection.

At block 550, processing logic provides an encrypted digital image to the embedded system over the second session. One embodiment of providing the digital image to the embedded system by initiating an over the air update is set forth below with reference to FIG. 7. After block 550, the method of FIG. 5 terminates.

Figure 6:
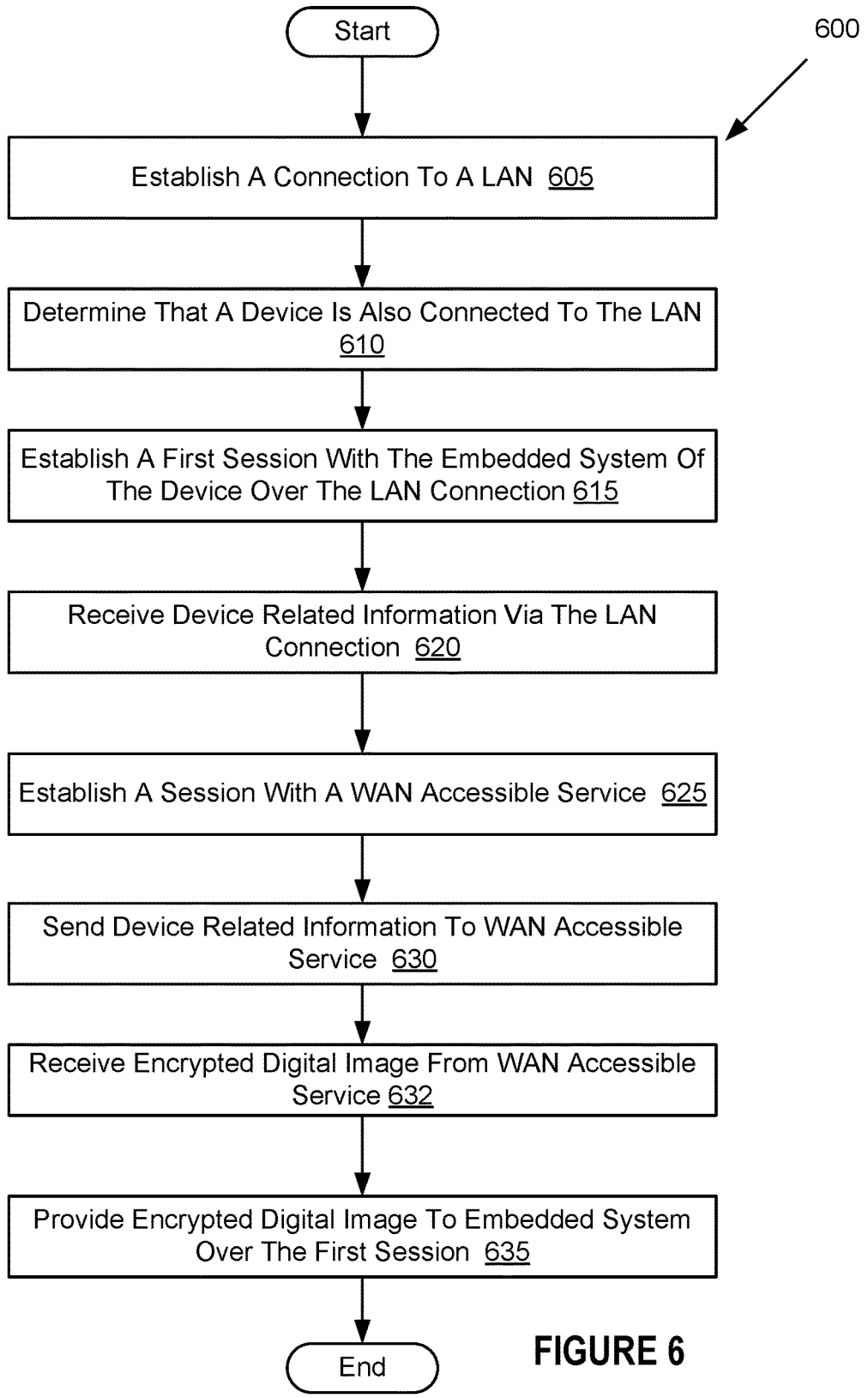
FIG. 6 is a flow chart of an example method of connecting to a device with an embedded system that is connected to a local area network.

FIG. 6 is a flow chart of an example method 600 of connecting to a device with an embedded system that is connected to a local area network.

At block 605 of method 600, processing logic establishes a Local Area Network (LAN) connection to a LAN. At block 610, processing logic determines that a device with an embedded system is also connected to the LAN. At block 615, processing logic establishes a first session with the embedded system of the device over the LAN connection. At block 620, processing logic receives device related information via the LAN connection. At block 625, processing logic establishes a session with a WAN accessible service.

At block 630, processing logic sends device related information to the WAN accessible service. At block 632, processing logic receives an encrypted digital image from the WAN accessible service. The encrypted digital image may be made up of a firmware update for the device with the embedded system, where the encrypted digital image is encrypted specifically for the device, and is unusable on other devices that have the same model as the device with the embedded system. In some implementations, processing logic may send the WAN accessible service the device related information received at block 620 so that the WAN accessible service may determine whether an encrypted digital image is available for the embedded system. At block 635, processing logic provides an encrypted digital image to the embedded system session over the first session. One embodiment of providing the digital image to the embedded system by initiating an over the air update is set forth below with reference to FIG. 7. After block 635, the method of FIG. 6 terminates.

Figure 7:
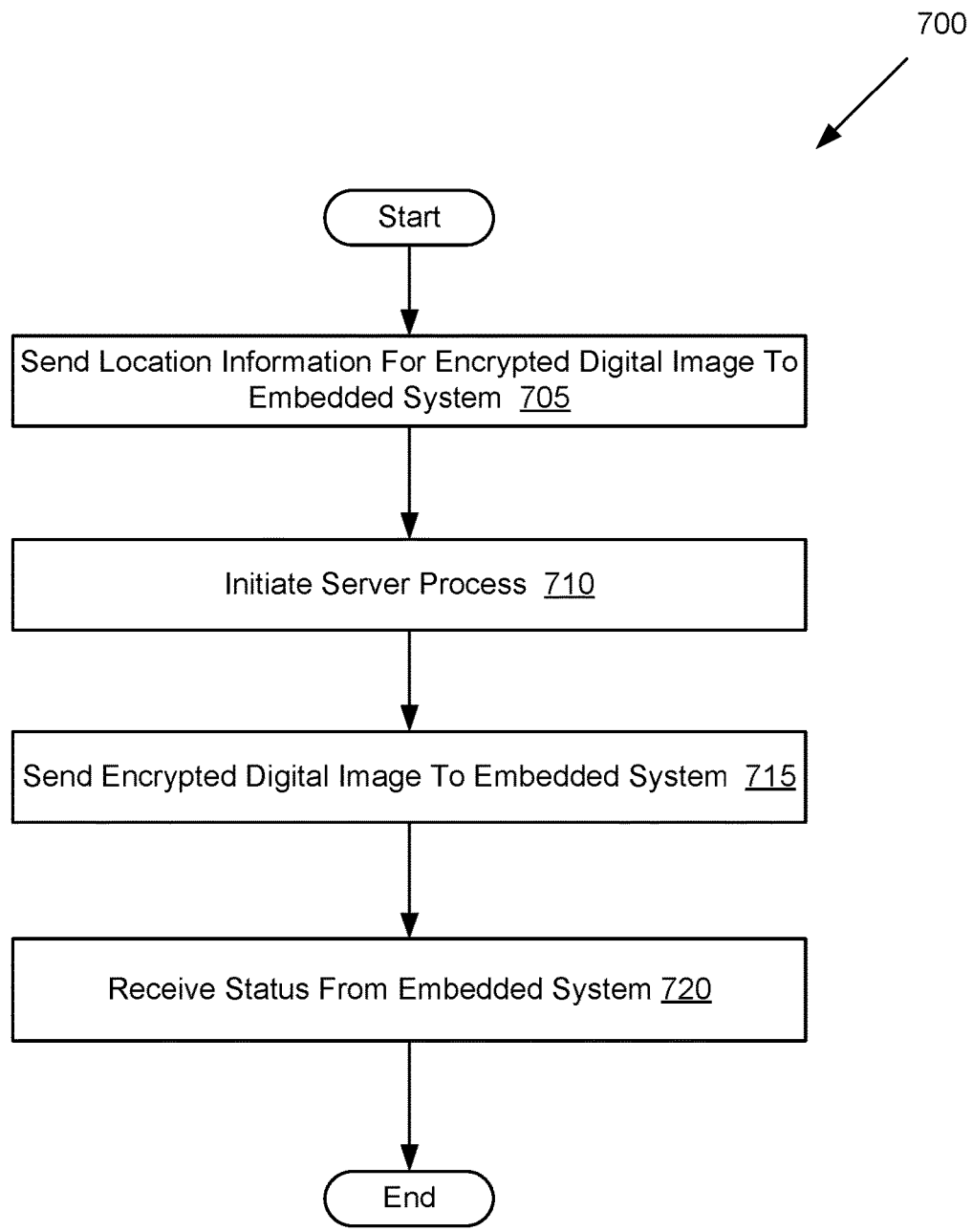
FIG. 7 is a flow chart of an example method of initiating an over the air update.

FIG. 7 is a flow chart of an example method 700 of initiating an over the air update. At block 705 of method 700, processing logic sends location information for an encrypted digital image to an embedded system. The location information may include a reference to a storage area of a computing device where the encrypted digital image is stored on the computing device. In some implementations, the reference may be a uniform resource locator (URL) that can access an addressable portion of the storage area of the computing device. At block 710, processing logic initiates a server process to permit the embedded system to retrieve the encrypted digital image from the storage area using the location information. In one embodiment, the server process may be a hypertext transfer protocol (HTTP) process. In one embodiment, the server process may be a file transfer protocol (FTP) process. The server process can accept an incoming session request from the embedded system to retrieve the encrypted digital image.

At block 715, processing logic may send the encrypted digital image to the embedded system via the session established between the embedded system and the server process initiated at block 710. The embedded system may then retrieve the encrypted digital image from the specified location over the session established with the server process. For example, processing logic may receive an HTTP get request from the embedded system to retrieve the encrypted digital image from the specified location. At block 720, processing logic receives a status from the embedded system that indicates whether the encrypted digital image was successfully retrieved and installed by the embedded system. For example, if the embedded system retrieves and decrypts the digital image and subsequently determines that the decrypted firmware update has been corrupted (e.g., has an incorrect digital signature), the embedded system may indicate this in the status. Processing logic may then forward the status information received from the embedded system to the WAN accessible service. In some implementations, the WAN accessible service may determine, using the status information, that the encrypted digital image should be regenerated and that the OTA update of the firmware for the embedded system be repeated. After block 715, the method of FIG. 7 terminates.

FIGS. 8-11 are flow diagrams showing various methods of operations performed by a WAN accessible service. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by WAN accessible service of FIG. 2B.

Figure 8:
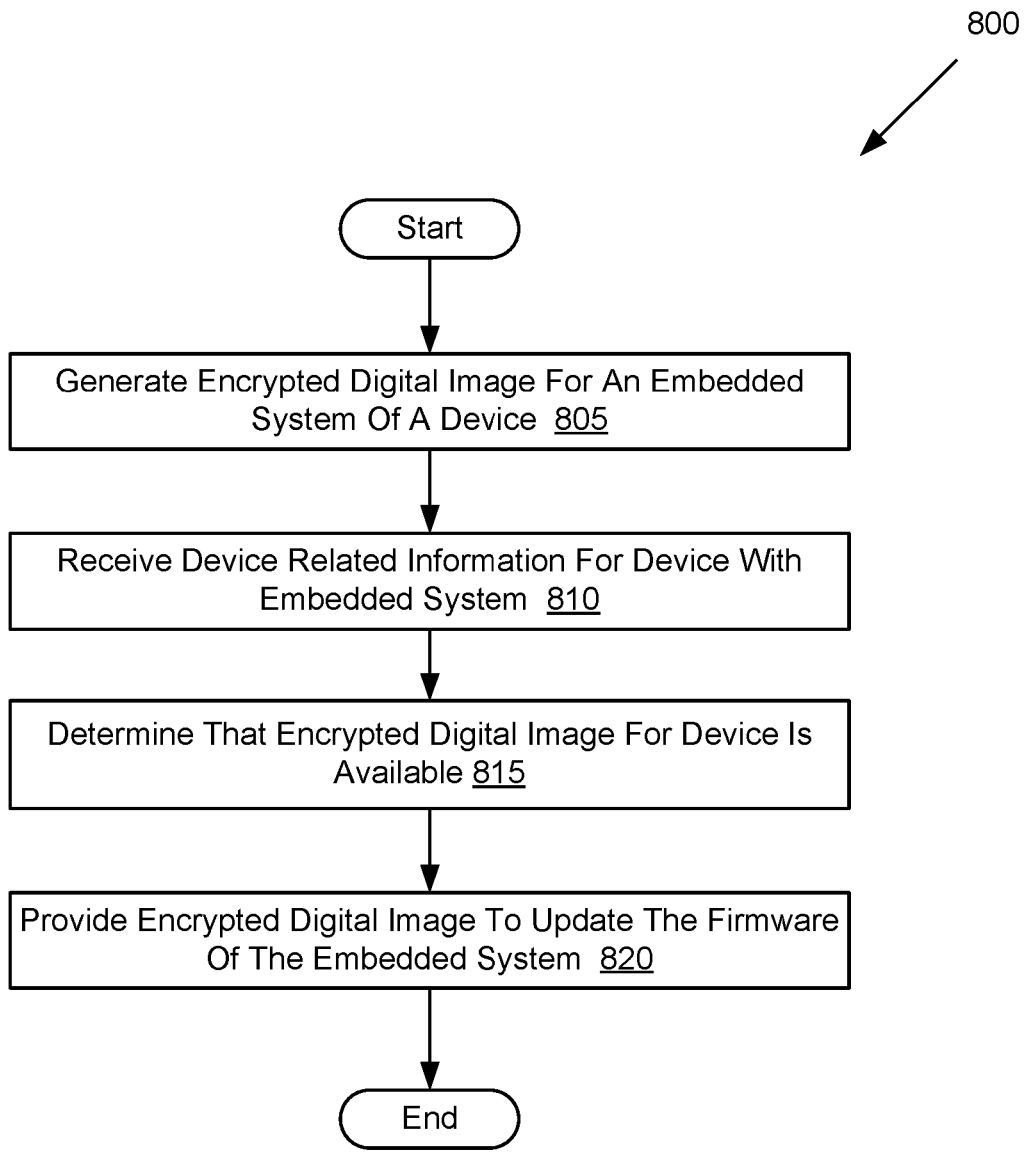
FIG. 8 is a flow chart of an example method of providing an encrypted digital image to be installed on an embedded system by a local over the air update.

FIG. 8 is a flow chart of an example method 800 of providing an encrypted digital image to be installed on an embedded system by an over the air update.

At block 805 of method 800 processing logic generates an encrypted digital image for an embedded system of a device. The encrypted digital image can include a firmware update for the embedded system for a device having a specific device serial number (DSN), where the encrypted digital image is usable only for the device having the specific DSN.

At block 810, processing logic receives device related information from a computing device. The device related information can include the DSN of the device with the embedded system and a version number of a current firmware component installed on the embedded system. At block 815, processing logic determines that the encrypted digital image for the device is available. Embodiments that determine that the encrypted digital image for the device is available are set forth below with reference to FIGS. 9-10. At block 820, processing logic provides the encrypted digital image to the computing device for use by the computing device to update a firmware version of the embedded system. After block 820, the method of FIG. 8 terminates.

Figure 9:
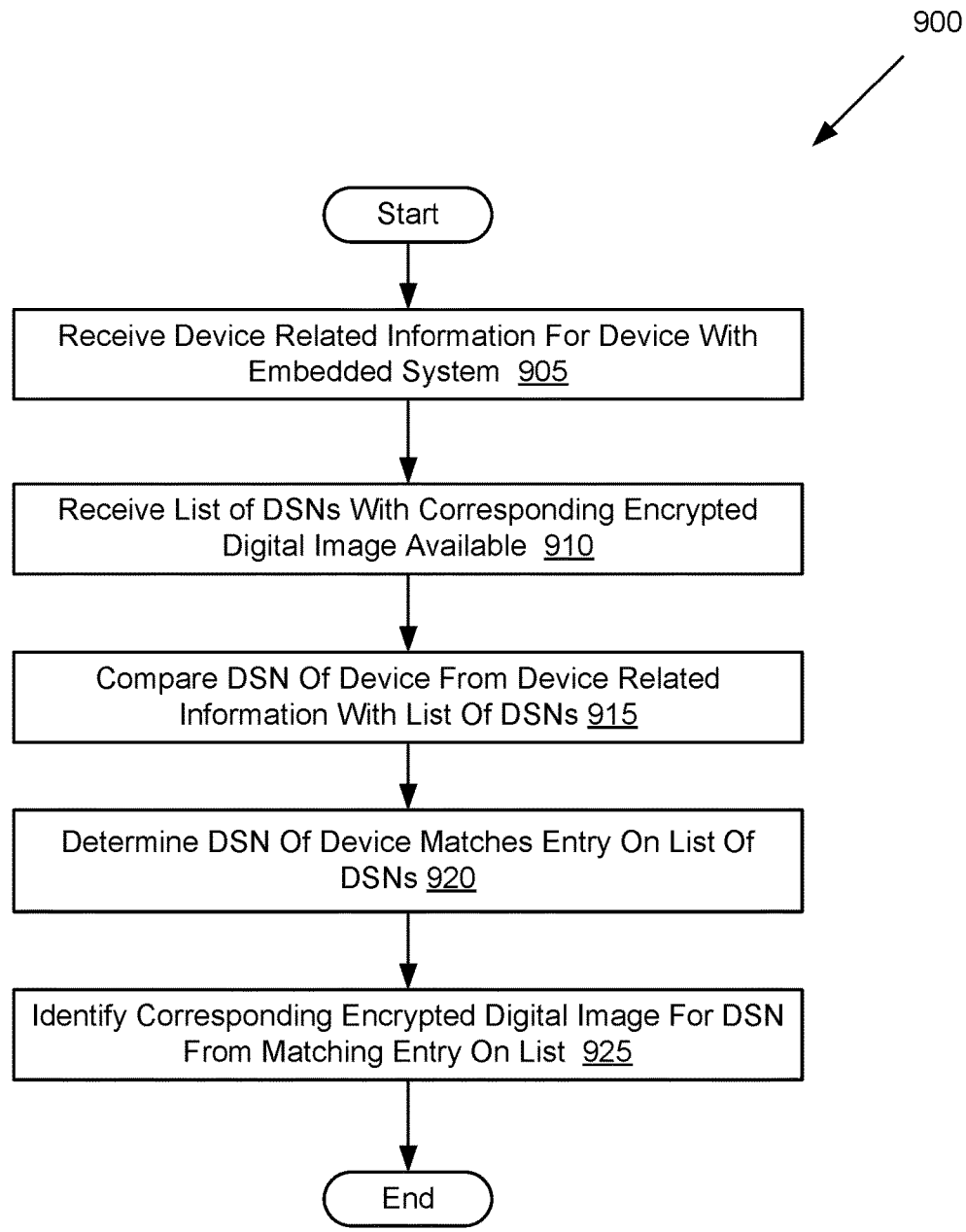
FIG. 9 is a flow chart of an example method of determining that an encrypted digital image is available.

FIG. 9 is a flow chart of an example method 900 of determining that an encrypted digital image is available. At block 905 of method 900, processing logic receives device related information for a device with an embedded system. At block 910, processing logic receives a list of DSNs with corresponding encrypted digital images available. At block 915, processing logic compares the DSN of the device with the embedded system from the device related information received at block 905 with the list of DSNs received at block 910.

At block 920, processing logic determines that the DSN of the device matches an entry on the list of DSNs. At block 925, processing logic identifies a corresponding encrypted digital image for the DSN from the matching entry on the list. After block 925, the method of FIG. 9 terminates.

Figure 10:
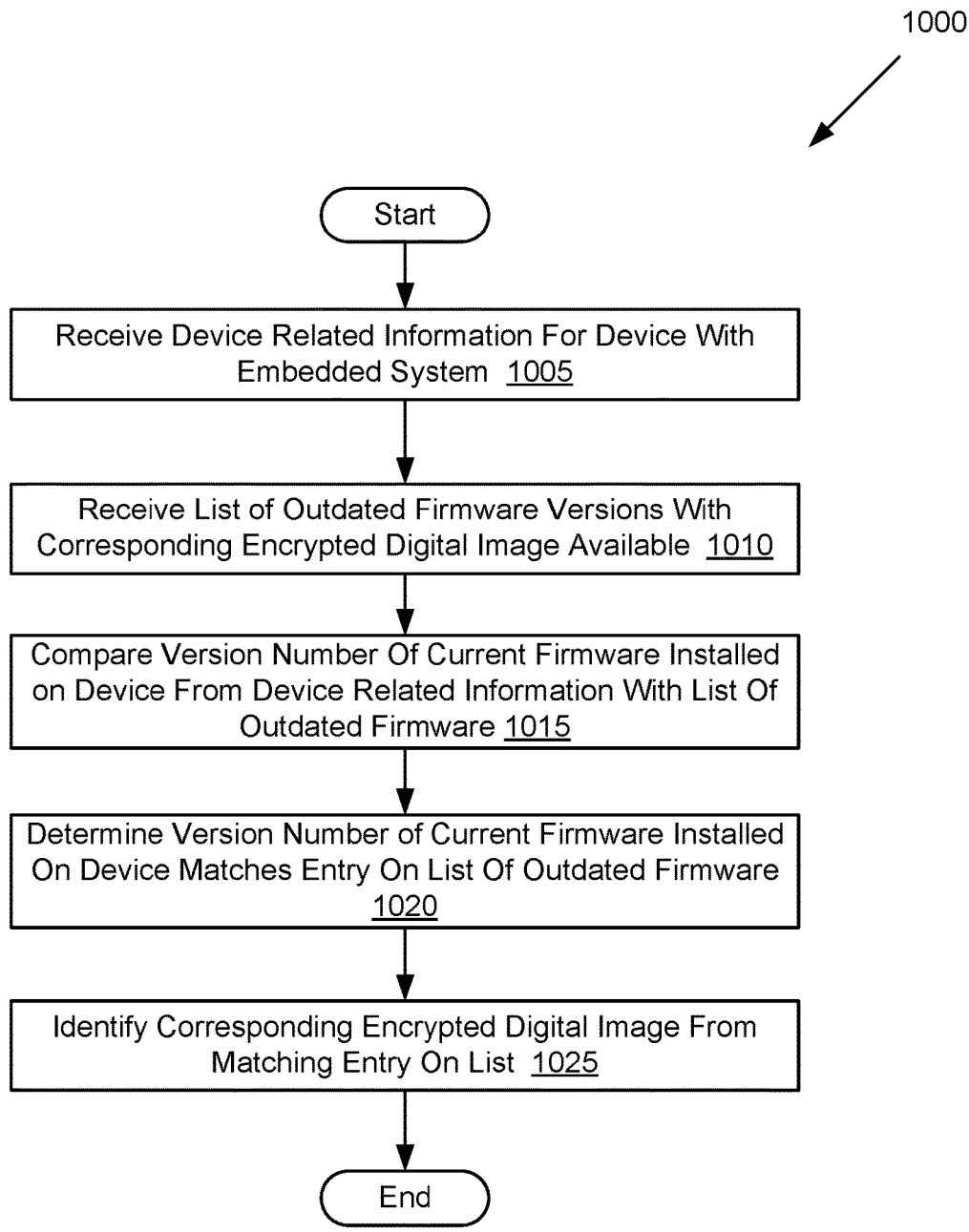
FIG. 10 is a flow chart of an example method of generating an encrypted digital image.

FIG. 10 is a flow chart of an example method 1000 of determining that an encrypted digital image is available.

At block 1005 of method 1000, processing logic receives device related information for a device with an embedded system. At block 1010, processing logic receives a list of outdated firmware versions with corresponding encrypted digital images available. At block 1015, processing logic compares the version number of the current firmware installed on the device from the device related information received at block 1005 with the list of outdated firmware versions received at block 1010. At block 1020, processing logic determines that the version number of the current firmware installed on the device matches an entry on the list of outdated firmware.

At block 1025, processing logic identifies a corresponding encrypted digital image from the matching entry on the list. After block 1025, the method of FIG. 10 terminates.

Figure 11:
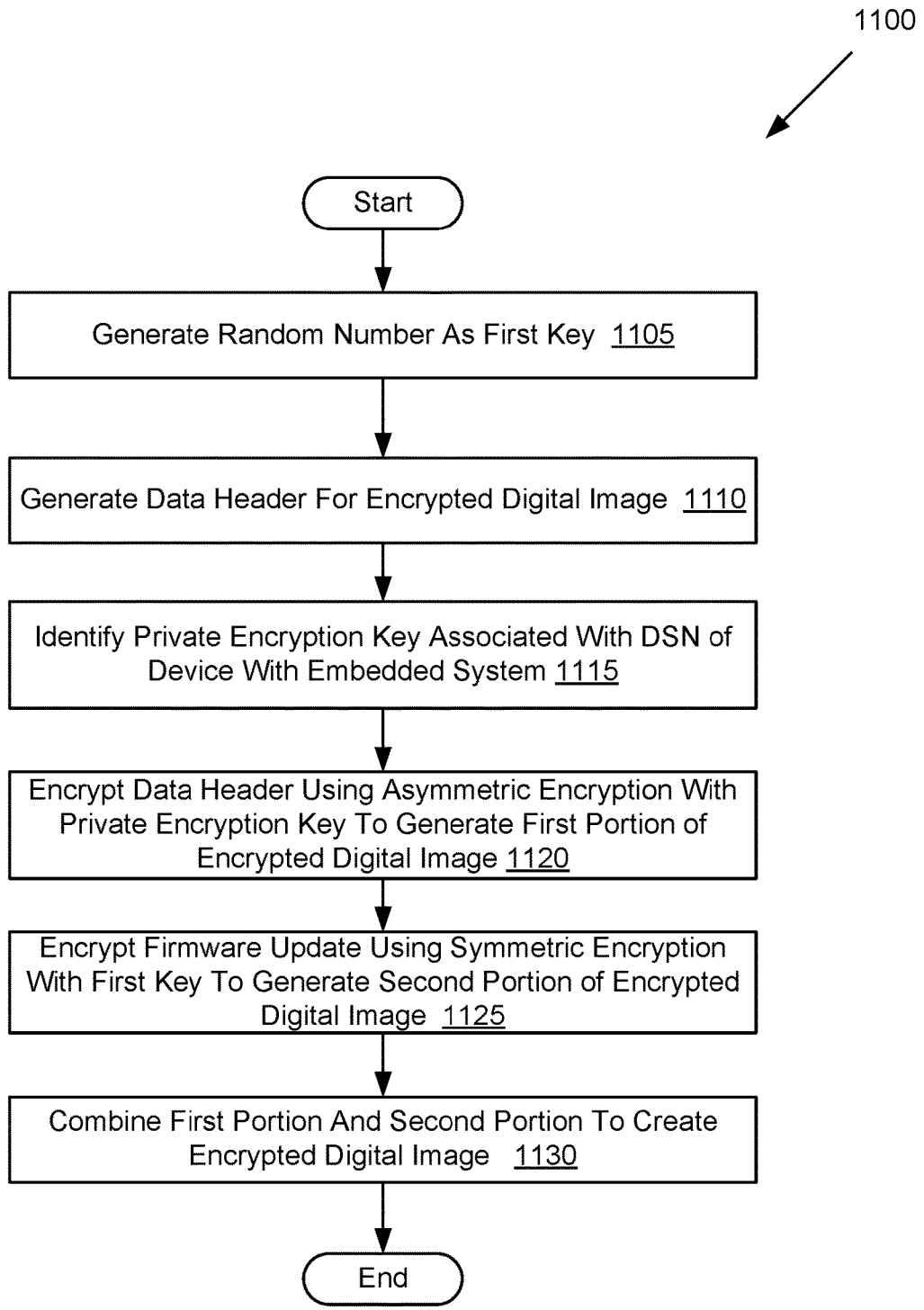
FIG. 11 is a flow chart of an example method of providing an encrypted digital image to be installed on an embedded system by an over the air update.

FIG. 11 is a flow chart of an example method 1100 of generating an encrypted digital image. At block 1105 of method 1100 processing logic generates a random number as a first key. At block 1110, processing logic generates a data header for an encrypted digital image. The data header can include the first key generated at block 1105, metadata associated with the encrypted digital image, and a digital signature for the encrypted digital image. Processing logic may compute the digital signature of a digital image prior to encrypting the digital image. At block 1115, processing logic identifies a private encryption key associated with the DSN of a device with an embedded system. At block 1120, processing logic encrypts the data header generated at block 1110 using asymmetric encryption with the private encryption key from block 1115 to generate a first portion of the encrypted digital image. At block 1125, processing logic encrypts a firmware update for the embedded system using symmetric encryption with the first key to generate a second portion of the encrypted digital image. At block 1130, processing logic combines the first portion and the second portion to create the encrypted digital image. After block 1130, the method of FIG. 11 terminates.

Figure 12:
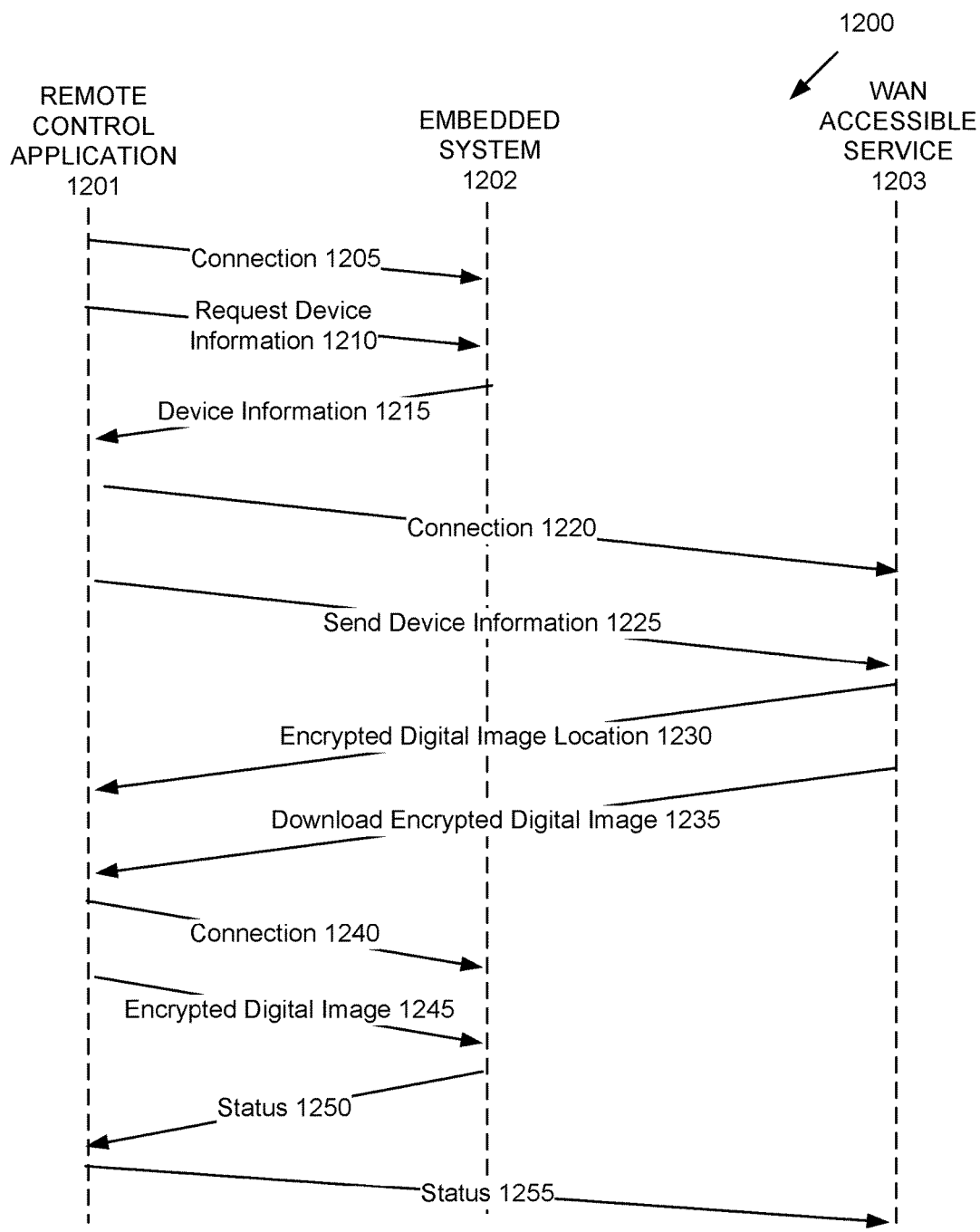
FIG. 12 is a timing diagram of performing an over the air update in accordance with an embodiment of the present invention.

FIG. 12 is a timing diagram 1200 of performing an over the air update of firmware in embedded system 1202 by a remote control application 1201 in accordance with an embodiment of the present invention. The timing diagram 1200 shows that the remote control application 1201 acts as a proxy for delivering an encrypted digital image containing a firmware update from WAN accessible service 1203 to embedded system 1202.

Initially the remote control application 1201 may not have a session with the embedded system 1201, and may establish a connection 1205 to initiate such a session. Remote control application 1201 may connect to embedded system 1202 via a LAN connection, or directly with the embedded system 1202 operating as an access point. The connection may be established as further described above with respect to FIGS. 1-2. Subsequent to establishing the session with the embedded system 1202, remote control application 1201 may send request for device information 1210 to the embedded system 1202 for device related information such as the DSN for the device with the embedded system 1202, the firmware version installed on embedded system 1202, etc. Embedded system 1202 may then send device information 1215 to the remote control application 1201.

At some later time, the remote control application 1201 may then establish a connection 1220 with WAN accessible service 1203. In embodiments where connection 1205 was established with embedded system 1202 operating as an access point, remote control application 1201 may first disconnect from embedded system 1202. In embodiments where connection 1205 is established using a LAN connection, connection 1220 may be established using the same LAN connection. Once connection 1220 has been established, remote control application 1201 may send device information 1225 to WAN accessible service 1203. In the illustrated embodiment, WAN accessible service determines whether an encrypted digital image is available for embedded system 1202 using the device information 1225.

WAN accessible service 1203 can then send encrypted digital image location 1230 to remote control application 1201. The encrypted digital image location 1230 may include a uniform resource locator (URL) of the encrypted digital image that remote control application 1201 may use to download the encrypted digital image. Remote control application 1201 may then initiate the download of encrypted digital image 1235 from the received location.

Remote control application may then re-establish the connection with embedded system 1202 by initiating connection 1240. In embodiments where embedded system 1202 is operating as an access point, remote control application 1201 may first disconnect from WAN accessible service 1203 and establish a new connection with embedded system 1202. In embodiments where embedded system 1202 is connected to a LAN, remote control application may use the session with embedded system 1202 that was established for connection 1205.

Remote control application 1201 may then initiate the OTA update of the firmware on embedded system 1202 by providing the encrypted digital image 1245 to embedded system 1202. In one embodiment, remote control application 1201 may start a server process that permits the embedded system 1202 to download the encrypted digital image stored by remote control application 1201. In some implementations, embedded system 1202 may then send a status 1250 to remote control application 1201 to indicate whether the encrypted digital image has been successfully installed. Subsequently, remote control application 1201 may send status 1255 to WAN accessible service 1203 to report the success or failure of the delivery of the encrypted digital image to embedded system 1202.

Figure 13:
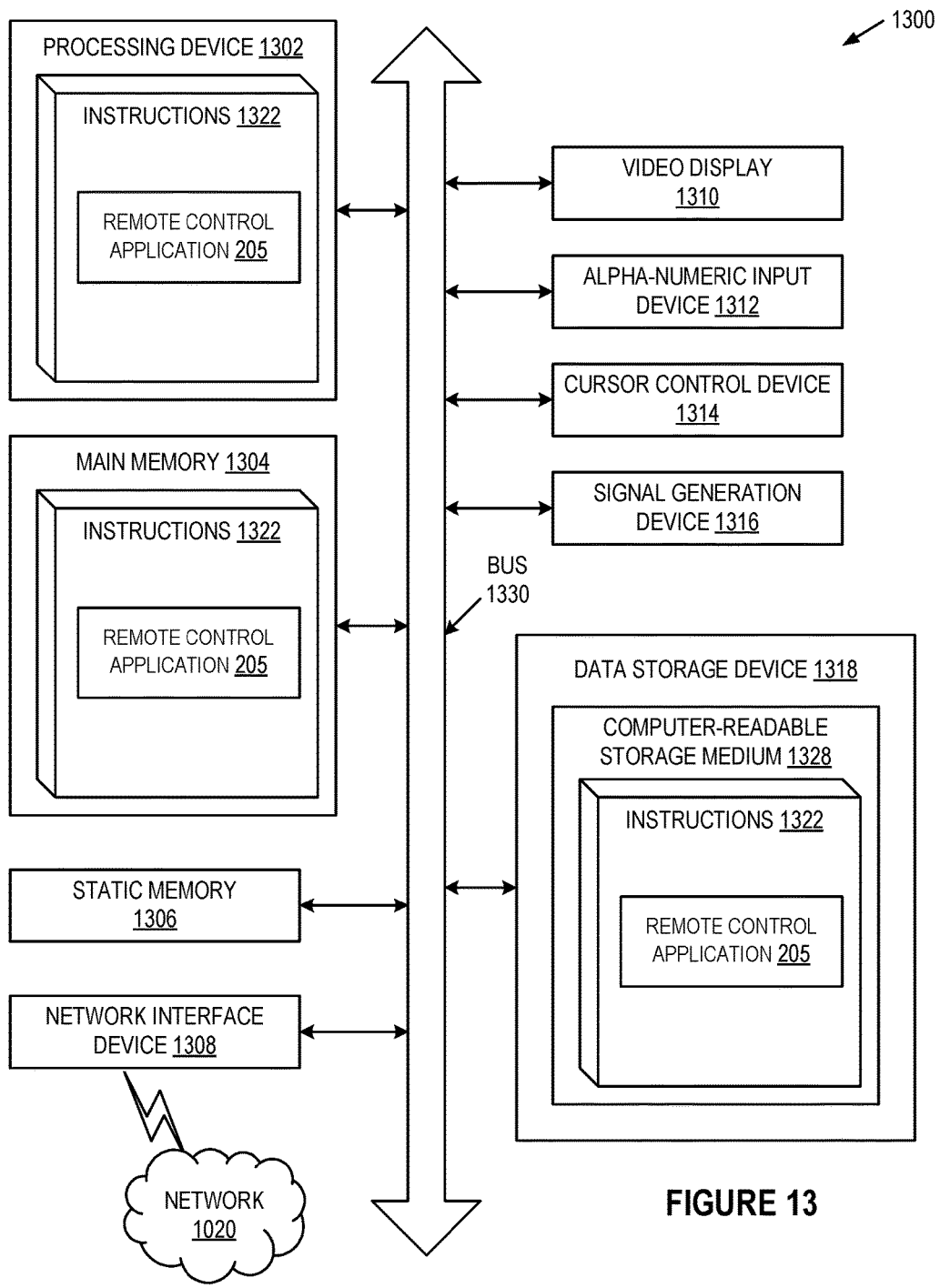
FIG. 13 illustrates a block diagram of one embodiment of a computing device.

FIG. 13 illustrates a diagrammatic representation of a machine in the example form of a computing device 1300 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 1300 includes a processing device 1302, a main memory 1304 (e.g., read-only memory (ROM), flash memory, dynamic random access memory (DRAM) such as synchronous DRAM (SDRAM) or Rambus DRAM (RDRAM), etc.), a static memory 1306 (e.g., flash memory, static random access memory (SRAM), etc.), and a secondary memory (e.g., a data storage device 1318), which communicate with each other via a bus 1330.

Processing device 1302 represents one or more general-purpose processors such as a microprocessor, central processing unit, or the like. More particularly, the processing device 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. Processing device 1002 is configured to execute the processing logic (instructions 1322) for performing the operations and steps discussed herein.

The computing device 1300 may further include a network interface device 1308. The computing device 1000 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker).

The data storage device 1318 may include a machine-readable storage medium (or more specifically a computer-readable storage medium) 1328 on which is stored one or more sets of instructions 1322 embodying any one or more of the methodologies or functions described herein. The instructions 1322 may also reside, completely or at least partially, within the main memory 1304 and/or within the processing device 1302 during execution thereof by the computer system 1300, the main memory 1304 and the processing device 1302 also constituting computer-readable storage media.

The computer-readable storage medium 1328 may also be used to store a remote control application (as described with reference to FIG. 2A), and/or a software library containing methods that call a remote control application. While the computer-readable storage medium 1328 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1-2B) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "storing", "initiating", "establishing", "disconnecting", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   determining, by a computing device, a unique identifier associated with a device comprising an embedded system, wherein the computing device is connected to a local area network (LAN) and the device is connected to the LAN;
   determining that the embedded system is unable to connect to a wide area network (WAN) accessible service;
   sending, by the computing device and to the WAN accessible service, the unique identifier and at least one of a) a notification that the embedded system is unable to connect to the WAN accessible service or b) a query asking whether a firmware update exists;
   receiving, by the computing device, an encrypted digital image from the WAN accessible service, the encrypted digital image comprising the firmware update for the device, wherein the encrypted digital image is encrypted specifically for the device having the unique identifier and is unusable on other devices having a same model as the device;
   storing, by the computing device, the encrypted digital image in a storage area on the computing device; and
   initiating, by the computing device, an over the air update of a firmware of the device using the encrypted digital image comprising the firmware update.

2. The method of claim 1, wherein the computing device is a mobile computing device executing a remote control application for the device, the method further comprising:
   determining that a first firmware version is installed on the embedded system;
   determining that a newer second firmware version exists for the embedded system; and determining that the over the air update is configured to be initiated by the computing device to update the embedded system from the mobile computing device.

3. The method of claim 1, further comprising:
determining that the device is operating as an access point;
establishing a first connection with the embedded system of the device using the access point;
establishing a first session with the embedded system over the first connection; and
receiving device related information via the first connection, the device related information comprising the unique identifier and a version number of a current firmware version installed on the embedded system.

4. The method of claim 3, further comprising:
responsive to receiving the device related information, disconnecting from the access point and establishing a second connection with the WAN accessible service;
wherein initiating the over the air update comprises:
disconnecting from the WAN accessible service;
establishing a third connection with the embedded system of the device using the access point;
establishing a second session with the embedded system over the third connection; and
providing the encrypted digital image to the embedded system of the device over the second session.

5. The method of claim 4, wherein initiating the over the air update further comprises:
sending location information to the embedded system, wherein the location information comprises a reference to the storage area of the computing device where the encrypted digital image is stored on the computing device;
initiating a server process on the computing device to permit the embedded system to retrieve the encrypted digital image from the storage area of the computing device using the location information; and
receiving a status from the embedded system that indicates whether the encrypted digital image was successfully retrieved by the embedded system.

6. The method of claim 1, further comprising:
establishing, by the computing device, a LAN connection to the LAN;
determining that the device is also connected to the LAN;
establishing a first session with the embedded system over the LAN connection; and
receiving device related information via the LAN connection, the device related information comprising the unique identifier and a version number of a current firmware version installed on the embedded system.

7. The method of claim 6, further comprising:
establishing a second session with the WAN accessible service, wherein the unique identifier is sent to the WAN accessible service over the second session; and
wherein initiating the over the air update comprises providing the encrypted digital image to the embedded system of the device over the first session.

8. The method of claim 1, wherein receiving the encrypted digital image from the WAN accessible service comprises:
receiving location information from the WAN accessible service, wherein the location information indicates where the encrypted digital image is stored on the WAN accessible service; and
retrieving the encrypted digital image from the location.

9. A non-transitory computer readable storage medium having instructions that, when executed by a processing device, cause the processing device to perform operations comprising:
determining a unique identifier associated with a device comprising an embedded system, wherein the processing device is connected to a local area network (LAN) and the device is connected to the LAN;
determining that the embedded system is unable to connect to a wide area network (WAN) accessible service;
sending, to the WAN accessible service, the unique identifier and at least one of a) a notification that the embedded system is unable to connect to the WAN accessible service or b) a query asking whether a firmware update exists;
receiving an encrypted digital image from the WAN accessible service, the encrypted digital image comprising the firmware update for the device, wherein the encrypted digital image is encrypted specifically for the device having the unique identifier and is unusable on other devices having a same model as the device;
storing the encrypted digital image in a storage area on the processing device; and
initiating an over the air update of a firmware of the device using the encrypted digital image comprising the firmware update.

10. The non-transitory computer readable storage medium of claim 9, the operations further comprising:
determining that the device is operating as an access point;
establishing a first connection with the embedded system of the device using the access point;
establishing a first session with the embedded system over the first connection;
receiving device related information via the first connection, the device related information comprising the unique identifier and a version number of a current firmware version installed on the embedded system; and
responsive to receiving the device related information, disconnecting from the access point and establishing a second connection with the WAN accessible service;
wherein initiating the over the air update comprises:
disconnecting from the WAN accessible service;
establishing a third connection with the embedded system of the device using the access point;
establishing a second session with the embedded system over the third connection; and
providing the encrypted digital image to the embedded system of the device over the second session.

11. The non-transitory computer readable storage medium of claim 9, wherein the operations further comprising:
establishing a LAN connection to the LAN;
determining that the device is also connected to the LAN;
establishing a first session with the embedded system over the LAN connection;
receiving device related information via the LAN connection, the device related information comprising the unique identifier and a version number of a current firmware version installed on the embedded system;
establishing a second session with the WAN accessible service, wherein the unique identifier is sent to the WAN accessible service over the second session; and
wherein initiating the over the air update comprises providing the encrypted digital image to the embedded system of the device over the first session.

12. The non-transitory computer readable storage medium of claim 9, the operations further comprising:
- sending location information to the embedded system, wherein the location information comprises a reference to the storage area of the processing device where the encrypted digital image is stored on the processing device;
- initiating a server process on the processing device to permit the embedded system to retrieve the encrypted digital image from the storage area of the processing device using the location information; and
- receiving a status from the embedded system that indicates whether the encrypted digital image was successfully retrieved by the embedded system.

13. The non-transitory computer readable storage medium of claim 9, wherein receiving the encrypted digital image from the WAN accessible service comprises:
- receiving location information from the WAN accessible service, wherein the location information indicates where the encrypted digital image is stored on the WAN accessible service; and
- retrieving the encrypted digital image from the location.

14. The non-transitory computer readable storage medium of claim 9, wherein the processing device is a mobile computing device executing a remote control application for the device, the operations further comprising:
- determining that a first firmware version is installed on the embedded system;
- determining that a newer second firmware version exists for the embedded system; and
- determining that the over the air update is configured to be initiated by the processing device to update the embedded system from the mobile computing device.

\* \* \* \* \*